United States Patent
Yang et al.

(10) Patent No.: US 10,050,750 B2
(45) Date of Patent: Aug. 14, 2018

(54) TRAINING FIELD TONE PLANS FOR MIXED-RATE WIRELESS COMMUNICATION NETWORKS

(71) Applicant: QUALCOMM Incorporated, San Diego, CA (US)

(72) Inventors: Lin Yang, San Diego, CA (US); Bin Tian, San Diego, CA (US); Dung Ngoc Doan, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 14/932,892

(22) Filed: Nov. 4, 2015

(65) Prior Publication Data

US 2016/0165482 A1    Jun. 9, 2016

Related U.S. Application Data

(60) Provisional application No. 62/210,932, filed on Aug. 27, 2015, provisional application No. 62/089,802, filed on Dec. 9, 2014.

(51) Int. Cl.
| | |
|---|---|
| *H04W 28/06* | (2009.01) |
| *H04W 72/04* | (2009.01) |
| *H04L 5/00* | (2006.01) |
| *H04L 27/26* | (2006.01) |

(52) U.S. Cl.
CPC ............ *H04L 5/00* (2013.01); *H04L 27/2613* (2013.01)

(58) Field of Classification Search
CPC .............................. H04L 27/2613; H04L 5/00
See application file for complete search history.

(56) References Cited

U.S. PATENT DOCUMENTS

2014/0307612 A1    10/2014 Vermani et al.

OTHER PUBLICATIONS

IEEE P802.11n™/D9.0 Draft Standard for Information Technology—Telecommunications and information exchange between systems—Local and metropolitan area networks Specific requirements Part 11: Wireless LAN Medium Access Control (MAC) and Physical Layer (PHY) specifications Amendment 5: Enhancements for Higher Throughput.*

(Continued)

*Primary Examiner* — Yemane Mesfin
*Assistant Examiner* — Henry Baron
(74) *Attorney, Agent, or Firm* — Knobbe, Martens, Olson & Bear, LLP

(57) ABSTRACT

A method of wirelessly communicating a packet can include generating, at a wireless device, a packet including a training field based on a training field tone plan. The method further includes populating training tones in the training field tone plan by duplicating tone positions from a base training field one or more times, and adding one or more additional sub-band direct current (DC) tones or edge tones. The method further includes transmitting the packet.

24 Claims, 14 Drawing Sheets

$$r_{HE-STF}^{(i_{RU})}(t) = \frac{\sqrt{N_{HE-data,i_{RU}}^{Tone}}}{\sqrt{N_{HE-STF,i_{RU}}^{Tone} N_{STS,total,i_{RU}}}} w_{T_{HE-STF}}(t)$$

$$*\Sigma_{k=STF\ tones\ in\ i_{RU}} \Sigma_{u=users\ in\ i_{RU}} \Sigma_{m=ss\ each\ user}(Q_k * \gamma_k * HES_k * \exp(j2\pi k\Delta_F(t - T_{CSD,m})))$$

(56) References Cited

OTHER PUBLICATIONS

Draft Standard for Information Technology Telecommunications and information exchange between systems. Local and metropolitan area networks Specific requirements Part 11: Wireless LAN Medium Access Control (MAC) and Physical Layer (PHY) specifications Amendment 5 Enhancements for Higher Throughput IEEE P802.11N/D9.0, Mar. 1, 2009 (Mar. 1, 2009), pp. 1,2,276-297, XP002606795. IEEE P802.11n/D9.0 Retrieved from the Internet: URL:http://ieeexplore.ieee.org/stamp/stamp.jsp"tp=&arnumber=4810960 [retrieved on Oct. 25, 2010] pp. 1,2, 276-297; 24 pages.
International Search Report and Written Opinion—PCT/US2015/063685—ISA/EPO—dated May 4, 2016.
Partial International Search Report—PCT/US2015/063685—ISA/EPO—dated Feb. 29, 2016.

\* cited by examiner

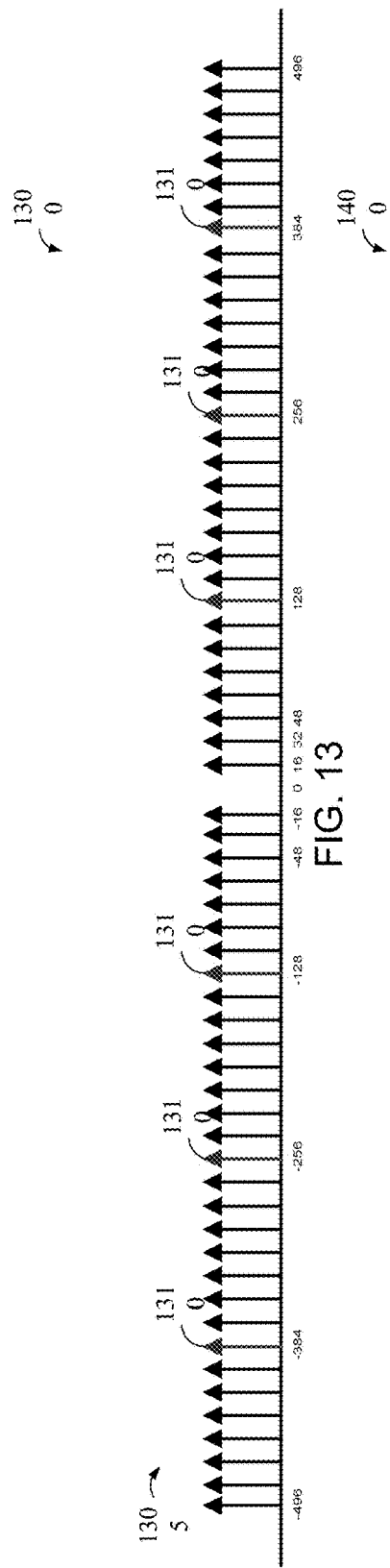
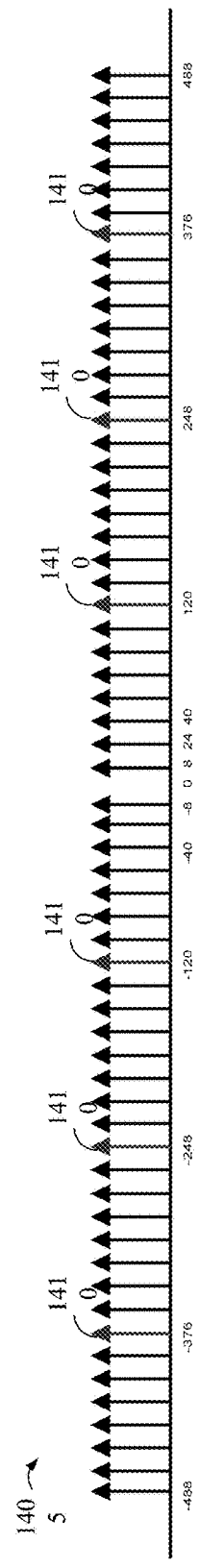
FIG. 13
FIG. 14

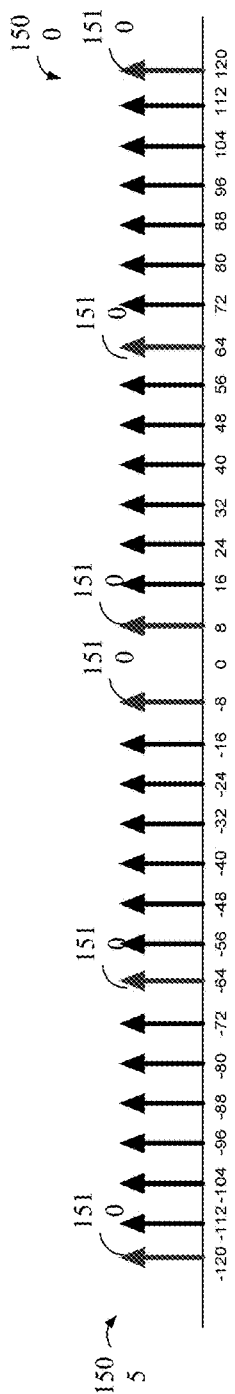
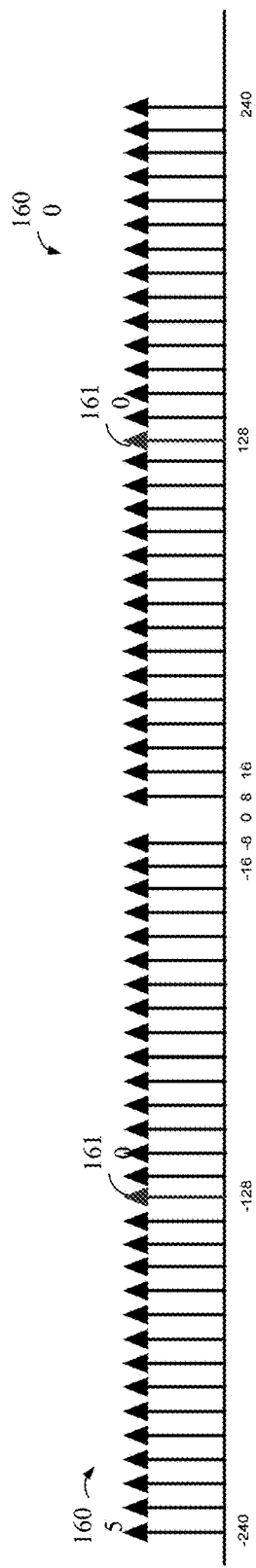
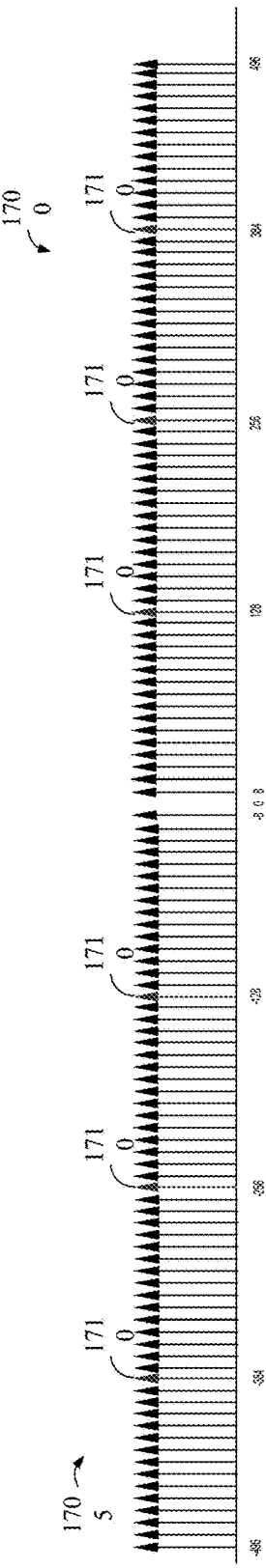
FIG. 15
FIG. 16
FIG. 17

$$r_{HE-STF}^{(i_{RU})}(t) = \frac{\sqrt{N_{HE-data,i_{RU}}^{Tone}}}{\sqrt{N_{HE-STF,i_{RU}}^{Tone} N_{STS,total,i_{RU}}}} w_{T_{HE-STF}}(t)$$

$$* \sum_{k=STF \text{ tones in } i_{RU}} \sum_{u=users \text{ in } i_{RU}} \sum_{m=ss \text{ each user}} (Q_k * \gamma_k * HES_k * \exp(j2\pi k\Delta_F(t - T_{CSD,m})))$$

FIG. 20

$$r_{HE-LTF}^{(i_{RU})}(t) = \frac{\sqrt{N_{HE-data,i_{RU}}^{Tone}}}{\sqrt{N_{HE-LTF,i_{RU}}^{Tone} N_{STS,total,i_{RU}}}} \sum_{n=0}^{N_{HELTF}-1} w_{T_{HELTF}}(t - n * T_{HELTF})$$

$$* \sum_{k=LTF \text{ tones in } i_{RU}} \sum_{u=users \text{ in } i_{RU}} \sum_{m=ss \text{ each user}} (Q_k * \gamma_k * A_k * HELTF_k * \exp(j2\pi k\Delta_F(t - n * T_{HELTF} - T_{GI} - T_{CSD,m})))$$

FIG. 21

TRAINING FIELD TONE PLANS FOR MIXED-RATE WIRELESS COMMUNICATION NETWORKS

PRIORITY CLAIM

This application claims priority under 35 U.S.C. § 119(e) to U.S. Provisional App. No. 62/089,802, filed Dec. 9, 2014, and to U.S. Provisional App. No. 62/210,932, filed Aug. 27, 2015, each of which is incorporated by reference herein in its entirety.

FIELD

Certain aspects of the present disclosure generally relate to wireless communications, and more particularly, to methods and apparatuses for mixed-rate communication in a wireless network.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, red, optical, etc. frequency bands. Wireless networks advantageously facilitate user mobility and rapid field deployment when compared to fixed wired networks.

As the volume and complexity of information communicated wirelessly between multiple devices continues to increase, overhead bandwidth required for physical layer control signals continues to increase at least linearly. The number of bits utilized to convey physical layer control information has become a significant portion of required overhead. Thus, with limited communication resources, it is desirable to reduce the number of bits required to convey this physical layer control information, especially as multiple types of traffic are concurrently sent from an access point to multiple terminals. For example, when a wireless device sends low-rate uplink communications to an access point, it is desirable to minimize the number of bits used for signaling and packet acquisition while maintaining backwards compatibility. Thus, there is a need for an improved protocol for mixed-rate transmissions.

SUMMARY

Various implementations of systems, methods and devices within the scope of the appended claims each have several aspects, no single one of which is solely responsible for the desirable attributes described herein. Without limiting the scope of the appended claims, some features are described herein.

Details of one or more implementations of the subject matter described in this specification are set forth in the accompanying drawings and the description below. Other features, aspects, and advantages can become apparent from the description, the drawings, and the claims. Note that the relative dimensions of the following figures may not be drawn to scale.

One aspect of the present disclosure includes a method of wireless communication. The method includes generating, at a wireless device, a packet including a training field based on a training field tone plan. The method further includes populating training tones in the training field tone plan by duplicating tone positions from a base training field one or more times, and adding one or more additional sub-band direct current (DC) tones or edge tones. The method further includes transmitting the packet.

In various embodiments, the method can further include scaling the training field on a per-resource unit basis. In various embodiments, said scaling can be proportional to a number of tones in an assigned resource unit. In various embodiments, said scaling can be performed on high-efficiency fields, in addition to scaling performed for one or more legacy fields.

In various embodiments, a magnitude of the training field at a time t, can be scaled by (the square root of a total number of tones that an assigned resource unit includes for payload transmission, divided by the square root of (a number of tones of the training field populated in the assigned resource unit, times a total number of space-time streams transmitted in the assigned resource unit)) times a window function, times (a spatial mapping matrix for a subcarrier k, times a tone rotation on tone k, times a value of the training field at a tone k, times e raised to the power of (a tone spacing, times (t minus a cyclic shift delay for an m-th spatial stream), times $j2\pi$), summed over each tone k in the training field, each user u in the assigned resource unit, and each spatial stream m for each user).

In various embodiments, a magnitude of the training field at a time t, can be scaled by (the square root of a total number of tones that an assigned resource unit includes for payload transmission, divided by the square root of (a number of tones of the training field populated in the assigned resource unit, times a total number of space-time streams transmitted in the assigned resource unit)) times (a window function for time values of each training field symbol, times (a spatial mapping matrix for a subcarrier k, times a tone rotation on a tone k, times a P- or R-matrix value at tone k, times a value of the training field at tone k, times e raised to the power of (a tone spacing, times (t minus the time values of each symbol of the training field, minus a guard interval duration, minus a cyclic shift delay for the m-th spatial stream), times $j2\pi$), summed over each tone k in the training field, each user u in the resource unit, and each spatial stream m for each user)), summed over each symbol in the training field.

In various embodiments, the method can further include shifting the base training field. In various embodiments, the training field can include a first training field portion having one or more repetitions at a first periodicity, and a second training field portion having one or more repetitions at a second periodicity. In various embodiments, the first periodicity and the second periodicity can be 0.8 µs.

In various embodiments, the training field can include populated training tones at: for a 20 MHz transmission, one of tone indices −96, −80, −64, −48, −32, −16, 16, 32, 48, 64, 80, and 96, tone indices −112, −96, −80, −64, −48, −32, −16, 16, 32, 48, 64, 80, 96, and 112, or tone indices −120, −104, −88, −72, −56, −40, −24, −8, 8, 24, 40, 56, 72, 88, 104, and 120; for a 40 MHz transmission, one of tone indices −240, −224, −208, −192, −176, −160, −144, −128, −112, −96, −80, −64, −48, −32, −16, 16, 32, 48, 64, 80, 96, 112, 128, 144, 160, 176, 192, 208, 224, and 240, or tone indices −232, −216, −200, −184, −168, −152, −136, −120, −104, −88, −72, −56, −40, −24, −8, 8, 24, 40, 56, 72, 88, 104, 120, 136, 152, 168, 184, 200, 216, and 232; and for an 80 MHz transmission, one of: tone indices −496, −480, −464, −448, −432, −416, −400, −384, −368, −352, −336, −320, −304, −288, −272, −256, −240, −224, −208, −192, −176, −160, −144, −128, −112, −96, −80, −64, −48, −32, −16, 16, 32, 48, 64, 80, 96, 112, 128, 144, 160, 176, 192, 208, 224, 240, 256, 272, 288, 304, 320, 336, 352, 368, 384, 400, 416, 432, 448, 464, 480, and 496, or tone indices −488, −472, −456, −440, −424, −408, −392, −376, −360, −344, −328, −312, −296, −280, −264, −248, −232, −216, −200, −184, −168, −152, −136, −120, −104, −88, −72, −56, −40, −24, −8, 8, 24, 40, 56, 72, 88, 104, 120, 136, 152, 168, 184, 200, 216, 232, 248, 264, 280, 296, 312, 328, 344, 360, 376, 392, 408, 424, 440, 456, 472, 488.

In various embodiments, the first periodicity and the second periodicity can be 1.6 μs. In various embodiments, the training field can include populated training tones at: for a 20 MHz transmission, tone indices −120, −112, −104, −96, −88, −80, −72, −64, −56, −48, −40, −32, −24, −16, −8, 8, 16, 24, 32, 40, 48, 56, 64, 72, 80, 88, 96, 104, 112, and 120; for a 40 MHz transmission, tone indices −240, −232, −224, −216, −208, −200, −192, −184, −176, −168, −160, −152, −144, −136, −128, −120, −112, −104, −96, −88, −80, −72, −64, −56, −48, −40, −32, −24, −16, −8, 8, 16, 24, 32, 40, 48, 56, 64, 72, 80, 88, 96, 104, 112, 120, 128, 136, 144, 152, 160, 168, 176, 184, 192, 200, 208, 216, 224, 232, and 240; and for an 80 MHz transmission, tone indices −496, −488, −480, −472, −464, −456, −448, −440, −432, −424, −416, −408, −400, −392, −384, −376, −368, −360, −352, −344, −336, −328, −320, −312, −304, −296, −288, −280, −272, −264, −256, −248, −240, −232, −224, −216, −208, −200, −192, −184, −176, −168, −160, −152, −144, −136, −128, −120, −112, −104, −96, −88, −80, −72, −64, −56, −48, −40, −32, −24, −16, −8, 8, 16, 24, 32, 40, 48, 56, 64, 72, 80, 88, 96, 104, 112, 120, 128, 136, 144, 152, 160, 168, 176, 184, 192, 200, 208, 216, 224, 232, 240, 248, 256, 264, 272, 280, 288, 296, 304, 312, 320, 328, 336, 344, 352, 360, 368, 376, 384, 392, 400, 408, 416, 424, 432, 440, 448, 456, 464, 472, 480, 488, and 496.

In various embodiments, the first periodicity and the second periodicity can be 0.8 μs for single-user transmissions and 1.6 μs for multi-user transmissions. In various embodiments, the first periodicity is 1.6 μs and the second periodicity is 0.8 μs. In various embodiments, the training field can include 2 repetitions of the first training field portion at 1.6 μs periodicity and 3 repetitions of the second training field portion at 0.8 μs periodicity. In various embodiments, the first portion includes first and second 0.8 μs segments, and the second portion includes the second 0.8 μs segment. In various embodiments, the base training field can include at least one of a legacy 20 MHz short training field and a high-efficiency 20 MHz short training field.

Another aspect provides an apparatus configured to perform wireless communication. The apparatus includes a processor configured to generate a packet including a training field based on a training field tone plan. The processor is further configured to populate training tones in the training field tone plan by duplicating tone positions from a base training field one or more times, and adding one or more additional sub-band direct current (DC) tones or edge tones. The apparatus further includes a transmitter configured to transmit the packet.

In various embodiments, the processing system can be further configured to scale the training field on a per-resource unit basis. In various embodiments, said scaling can be proportional to a number of tones in an assigned resource unit. In various embodiments, said scaling can be performed on high-efficiency fields, in addition to scaling performed for one or more legacy fields.

In various embodiments, a magnitude of the training field at a time t, can be scaled by (the square root of a total number of tones that an assigned resource unit includes for payload transmission, divided by the square root of (a number of tones of the training field populated in the assigned resource unit, times a total number of space-time streams transmitted in the assigned resource unit)) times a window function, times (a spatial mapping matrix for a subcarrier k, times a tone rotation on tone k, times a value of the training field at a tone k, times e raised to the power of (a tone spacing, times (t minus a cyclic shift delay for an m-th spatial stream), times j2π), summed over each tone k in the training field, each user u in the assigned resource unit, and each spatial stream m for each user).

In various embodiments, a magnitude of the training field at a time t, can be scaled by (the square root of a total number of tones that an assigned resource unit includes for payload transmission, divided by the square root of (a number of tones of the training field populated in the assigned resource unit, times a total number of space-time streams transmitted in the assigned resource unit)) times (a window function for time values of each training field symbol, times (a spatial mapping matrix for a subcarrier k, times a tone rotation on a tone k, times a P- or R-matrix value at tone k, times a value of the training field at tone k, times e raised to the power of (a tone spacing, times (t minus the time values of each symbol of the training field, minus a guard interval duration, minus a cyclic shift delay for the m-th spatial stream), times j2π), summed over each tone k in the training field, each user u in the resource unit, and each spatial stream m for each user)), summed over each symbol in the training field.

In various embodiments, the processor is further configured to shift the base training field. In various embodiments, the training field can include a first training field portion having one or more repetitions at a first periodicity, and a second training field portion having one or more repetitions at a second periodicity. In various embodiments, the first periodicity and the second periodicity can be 0.8 μs.

In various embodiments, the training field can include populated training tones at: for a 20 MHz transmission, one of tone indices −96, −80, −64, −48, −32, −16, 16, 32, 48, 64, 80, and 96, tone indices −112, −96, −80, −64, −48, −32, −16, 16, 32, 48, 64, 80, 96, and 112, or tone indices −120, −104, −88, −72, −56, −40, −24, −8, 8, 24, 40, 56, 72, 88, 104, and 120; for a 40 MHz transmission, one of tone indices −240, −224, −208, −192, −176, −160, −144, −128, −112, −96, −80, −64, −48, −32, −16, 16, 32, 48, 64, 80, 96, 112, 128, 144, 160, 176, 192, 208, 224, and 240, or tone indices −232, −216, −200, −184, −168, −152, −136, −120, −104, −88, −72, −56, −40, −24, −8, 8, 24, 40, 56, 72, 88, 104, 120, 136, 152, 168, 184, 200, 216, and 232; and for an 80 MHz transmission, one of: tone indices −496, −480, −464, −448, −432, −416, −400, −384, −368, −352, −336, −320, −304, −288, −272, −256, −240, −224, −208, −192, −176, −160, −144, −128, −112, −96, −80, −64, −48, −32, −16, 16, 32, 48, 64, 80, 96, 112, 128, 144, 160, 176, 192, 208, 224, 240, 256, 272, 288, 304, 320, 336, 352, 368, 384, 400, 416, 432, 448, 464, 480, and 496, or tone indices −488, −472, −456, −440, −424, −408, −392, −376, −360, −344, −328, −312, −296, −280, −264, −248, −232, −216, −200, −184, −168, −152, −136, −120, −104, −88, −72, −56, −40, −24, −8, 8, 24, 40, 56, 72, 88, 104, 120, 136, 152, 168, 184, 200, 216, 232, 248, 264, 280, 296, 312, 328, 344, 360, 376, 392, 408, 424, 440, 456, 472, 488.

In various embodiments, the first periodicity and the second periodicity can be 1.6 μs. In various embodiments, the training field can include populated training tones at: for a 20 MHz transmission, tone indices −120, −112, −104, −96, −88, −80, −72, −64, −56, −48, −40, −32, −24, −16, −8, 8, 16, 24, 32, 40, 48, 56, 64, 72, 80, 88, 96, 104, 112, and 120; for a 40 MHz transmission, tone indices −240, −232, −224, −216, −208, −200, −192, −184, −176, −168, −160, −152, −144, −136, −128, −120, −112, −104, −96, −88, −80, −72, −64, −56, −48, −40, −32, −24, −16, −8, 8, 16, 24, 32, 40, 48, 56, 64, 72, 80, 88, 96, 104, 112, 120, 128, 136, 144, 152, 160, 168, 176, 184, 192, 200, 208, 216, 224, 232, and 240; and for an 80 MHz transmission, tone indices −496, −488, −480, −472, −464, −456, −448, −440, −432, −424, −416, −408, −400, −392, −384, −376, −368, −360, −352, −344, −336, −328, −320, −312, −304, −296, −288, −280, −272, −264, −256, −248, −240, −232, −224, −216, −208, −200, −192, −184, −176, −168, −160, −152, −144, −136, −128, −120, −112, −104, −96, −88, −80, −72, −64, −56, −48, −40, −32, −24, −16, −8, 8, 16, 24, 32, 40, 48, 56, 64, 72, 80, 88, 96, 104, 112, 120, 128, 136, 144, 152, 160, 168, 176, 184, 192, 200, 208, 216, 224, 232, 240, 248, 256, 264, 272, 280, 288, 296, 304, 312, 320, 328, 336, 344, 352, 360, 368, 376, 384, 392, 400, 408, 416, 424, 432, 440, 448, 456, 464, 472, 480, 488, and 496.

In various embodiments, the first periodicity and second periodicity can be 0.8 μs for single-user transmissions and 1.6 μs for multi-user transmissions. In various embodiments, the first periodicity is 1.6 μs and the second periodicity is 0.8 μs. In various embodiments, the training field can include 2 repetitions of the first training field portion at 1.6 μs periodicity and 3 repetitions of the second training field portion at 0.8 μs periodicity. In various embodiments, the first portion includes first and second 0.8 μs segments, and the second portion includes the second 0.8 μs segment. In various embodiments, the base training field can include at least one of a legacy 20 MHz short training field and a high-efficiency 20 MHz short training field.

Another aspect provides another apparatus for wireless communication. The apparatus includes means for generating a packet including a training field based on a training field tone plan. The apparatus further includes means for populating training tones in the training field tone plan by duplicating tone positions from a base training field one or more times, and adding one or more additional sub-band direct current (DC) tones or edge tones. The apparatus further includes means for transmitting the packet.

In various embodiments, the apparatus can further include means for scaling the training field on a per-resource unit basis. In various embodiments, said scaling can be proportional to a number of tones in an assigned resource unit. In various embodiments, said scaling can be performed on high-efficiency fields, in addition to scaling performed for one or more legacy fields.

In various embodiments, a magnitude of the training field at a time t, can be scaled by (the square root of a total number of tones that an assigned resource unit includes for payload transmission, divided by the square root of (a number of tones of the training field populated in the assigned resource unit, times a total number of space-time streams transmitted in the assigned resource unit)) times a window function, times (a spatial mapping matrix for a subcarrier k, times a tone rotation on tone k, times a value of the training field at a tone k, times e raised to the power of (a tone spacing, times (t minus a cyclic shift delay for an m-th spatial stream), times j2π), summed over each tone k in the training field, each user u in the assigned resource unit, and each spatial stream m for each user).

In various embodiments, a magnitude of the training field at a time t, can be scaled by (the square root of a total number of tones that an assigned resource unit includes for payload transmission, divided by the square root of (a number of tones of the training field populated in the assigned resource unit, times a total number of space-time streams transmitted in the assigned resource unit)) times (a window function for time values of each training field symbol, times (a spatial mapping matrix for a subcarrier k, times a tone rotation on a tone k, times a P- or R-matrix value at tone k, times a value of the training field at tone k, times e raised to the power of (a tone spacing, times (t minus the time values of each symbol of the training field, minus a guard interval duration, minus a cyclic shift delay for the m-th spatial stream), times j2π), summed over each tone k in the training field, each user u in the resource unit, and each spatial stream m for each user)), summed over each symbol in the training field.

In various embodiments, the apparatus can further include means for shifting the base training field. In various embodiments, the training field can include a first training field portion having one or more repetitions at a first periodicity, and a second training field portion having one or more repetitions at a second periodicity. In various embodiments, the first periodicity and the second periodicity can be 0.8 μs.

In various embodiments, the training field can include populated training tones at: for a 20 MHz transmission, one of tone indices −96, −80, −64, −48, −32, −16, 16, 32, 48, 64, 80, and 96, tone indices −112, −96, −80, −64, −48, −32, −16, 16, 32, 48, 64, 80, 96, and 112, or tone indices −120, −104, −88, −72, −56, −40, −24, −8, 8, 24, 40, 56, 72, 88, 104, and 120; for a 40 MHz transmission, one of tone indices −240, −224, −208, −192, −176, −160, −144, −128, −112, −96, −80, −64, −48, −32, −16, 16, 32, 48, 64, 80, 96, 112, 128, 144, 160, 176, 192, 208, 224, and 240, or tone indices −232, −216, −200, −184, −168, −152, −136, −120, −104, −88, −72, −56, −40, −24, −8, 8, 24, 40, 56, 72, 88, 104, 120, 136, 152, 168, 184, 200, 216, and 232; and for an 80 MHz transmission, one of: tone indices −496, −480, −464, −448, −432, −416, −400, −384, −368, −352, −336, −320, −304, −288, −272, −256, −240, −224, −208, −192, −176, −160, −144, −128, −112, −96, −80, −64, −48, −32, −16, 16, 32, 48, 64, 80, 96, 112, 128, 144, 160, 176, 192, 208, 224, 240, 256, 272, 288, 304, 320, 336, 352, 368, 384, 400, 416, 432, 448, 464, 480, and 496, or tone indices −488, −472, −456, −440, −424, −408, −392, −376, −360, −344, −328, −312, −296, −280, −264, −248, −232, −216, −200, −184, −168, −152, −136, −120, −104, −88, −72, −56, −40, −24, −8, 8, 24, 40, 56, 72, 88, 104, 120, 136, 152, 168, 184, 200, 216, 232, 248, 264, 280, 296, 312, 328, 344, 360, 376, 392, 408, 424, 440, 456, 472, 488.

In various embodiments, the first periodicity and second periodicity can be 1.6 μs. In various embodiments, the training field can include populated training tones at: for a 20 MHz transmission, tone indices −120, −112, −104, −96, −88, −80, −72, −64, −56, −48, −40, −32, −24, −16, −8, 8, 16, 24, 32, 40, 48, 56, 64, 72, 80, 88, 96, 104, 112, and 120; for a 40 MHz transmission, tone indices −240, −232, −224, −216, −208, −200, −192, −184, −176, −168, −160, −152, −144, −136, −128, −120, −112, −104, −96, −88, −80, −72, −64, −56, −48, −40, −32, −24, −16, −8, 8, 16, 24, 32, 40, 48, 56, 64, 72, 80, 88, 96, 104, 112, 120, 128, 136, 144, 152, 160, 168, 176, 184, 192, 200, 208, 216, 224, 232, and 240; and for an 80 MHz transmission, tone indices −496, −488, −480, −472, −464, −456, −448, −440, −432, −424, −416, −408, −400, −392, −384, −376, −368, −360, −352, −344, −336, −328, −320, −312, −304, −296, −288, −280, −272, −264, −256, −248, −240, −232, −224, −216, −208, −200, −192, −184, −176, −168, −160, −152, −144, −136, −128, −120, −112, −104, −96, −88, −80, −72, −64, −56, −48, −40, −32, −24, −16, −8, 8, 16, 24, 32, 40, 48, 56, 64, 72, 80, 88, 96, 104, 112, 120, 128, 136, 144, 152, 160, 168, 176, 184, 192, 200, 208, 216, 224, 232, 240, 248, 256, 264, 272, 280, 288, 296, 304, 312, 320, 328, 336, 344, 352, 360, 368, 376, 384, 392, 400, 408, 416, 424, 432, 440, 448, 456, 464, 472, 480, 488, and 496.

In various embodiments, the first periodicity and the second periodicity can be 0.8 μs for single-user transmissions and 1.6 μs for multi-user transmissions. In various embodiments, the first periodicity is 1.6 μs and the second periodicity is 0.8 μs. In various embodiments, the training field can include 2 repetitions of the first training field portion at 1.6 μs periodicity and 3 repetitions of the second training field portion at 0.8 μs periodicity. In various embodiments, the first portion includes first and second 0.8 μs segments, and the second portion includes the second 0.8 μs segment. In various embodiments, the base training field can include at least one of a legacy 20 MHz short training field and a high-efficiency 20 MHz short training field.

Another aspect provides a non-transitory computer-readable medium. The medium includes code that, when executed, causes an apparatus to generate a packet including a training field based on a training field tone plan. The medium further includes code that, when executed, causes the apparatus to populate training tones in the training field tone plan by duplicating tone positions from a base training field one or more times, and adding one or more additional sub-band direct current (DC) tones or edge tones. The medium further includes code that, when executed, causes the apparatus to transmit the packet.

In various embodiments, the medium can further include code that, when executed, causes the apparatus to scale the training field on a per-resource unit basis. In various embodiments, said scaling can be proportional to a number of tones in an assigned resource unit. In various embodiments, said scaling can be performed on high-efficiency fields, in addition to scaling performed for one or more legacy fields.

In various embodiments, a magnitude of the training field at a time t, can be scaled by (the square root of a total number of tones that an assigned resource unit includes for payload transmission, divided by the square root of (a number of tones of the training field populated in the assigned resource unit, times a total number of space-time streams transmitted in the assigned resource unit)) times a window function, times (a spatial mapping matrix for a subcarrier k, times a tone rotation on tone k, times a value of the training field at a tone k, times e raised to the power of (a tone spacing, times (t minus a cyclic shift delay for an m-th spatial stream), times j2π), summed over each tone k in the training field, each user u in the assigned resource unit, and each spatial stream m for each user).

In various embodiments, a magnitude of the training field at a time t, can be scaled by (the square root of a total number of tones that an assigned resource unit includes for payload transmission, divided by the square root of (a number of tones of the training field populated in the assigned resource unit, times a total number of space-time streams transmitted in the assigned resource unit)) times (a window function for time values of each training field symbol, times (a spatial mapping matrix for a subcarrier k, times a tone rotation on a tone k, times a P- or R-matrix value at tone k, times a value of the training field at tone k, times e raised to the power of (a tone spacing, times (t minus the time values of each symbol of the training field, minus a guard interval duration, minus a cyclic shift delay for the m-th spatial stream), times j2π), summed over each tone k in the training field, each user u in the resource unit, and each spatial stream m for each user)), summed over each symbol in the training field.

In various embodiments, the medium can further include code that, when executed, causes the apparatus to shift the base training field. In various embodiments, the training field can include a first training field portion having one or more repetitions at a first periodicity, and a second training field portion having one or more repetitions at a second periodicity. In various embodiments, the first periodicity and the second periodicity can be 0.8 μs.

In various embodiments, the training field can include populated training tones at: for a 20 MHz transmission, one of tone indices −96, −80, −64, −48, −32, −16, 16, 32, 48, 64, 80, and 96, tone indices −112, −96, −80, −64, −48, −32, −16, 16, 32, 48, 64, 80, 96, and 112, or tone indices −120, −104, −88, −72, −56, −40, −24, −8, 8, 24, 40, 56, 72, 88, 104, and 120; for a 40 MHz transmission, one of tone indices −240, −224, −208, −192, −176, −160, −144, −128, −112, −96, −80, −64, −48, −32, −16, 16, 32, 48, 64, 80, 96, 112, 128, 144, 160, 176, 192, 208, 224, and 240, or tone indices −232, −216, −200, −184, −168, −152, −136, −120, −104, −88, −72, −56, −40, −24, −8, 8, 24, 40, 56, 72, 88, 104, 120, 136, 152, 168, 184, 200, 216, and 232; and for an 80 MHz transmission, one of: tone indices −496, −480, −464, −448, −432, −416, −400, −384, −368, −352, −336, −320, −304, −288, −272, −256, −240, −224, −208, −192, −176, −160, −144, −128, −112, −96, −80, −64, −48, −32, −16, 16, 32, 48, 64, 80, 96, 112, 128, 144, 160, 176, 192, 208, 224, 240, 256, 272, 288, 304, 320, 336, 352, 368, 384, 400, 416, 432, 448, 464, 480, and 496, or tone indices −488, −472, −456, −440, −424, −408, −392, −376, −360, −344, −328, −312, −296, −280, −264, −248, −232, −216, −200, −184, −168, −152, −136, −120, −104, −88, −72, −56, −40, −24, −8, 8, 24, 40, 56, 72, 88, 104, 120, 136, 152, 168, 184, 200, 216, 232, 248, 264, 280, 296, 312, 328, 344, 360, 376, 392, 408, 424, 440, 456, 472, 488.

In various embodiments, the first periodicity and the second periodicity can be 1.6 μs. In various embodiments, the training field can include populated training tones at: for a 20 MHz transmission, tone indices −120, −112, −104, −96, −88, −80, −72, −64, −56, −48, −40, −32, −24, −16, −8, 8, 16, 24, 32, 40, 48, 56, 64, 72, 80, 88, 96, 104, 112, and 120; for a 40 MHz transmission, tone indices −240, −232, −224, −216, −208, −200, −192, −184, −176, −168, −160, −152, −144, −136, −128, −120, −112, −104, −96, −88, −80, −72, −64, −56, −48, −40, −32, −24, −16, −8, 8, 16, 24, 32, 40, 48, 56, 64, 72, 80, 88, 96, 104, 112, 120, 128, 136, 144, 152, 160, 168, 176, 184, 192, 200, 208, 216, 224, 232, and 240; and for an 80 MHz transmission, tone indices −496, −488, −480, −472, −464, −456, −448, −440, −432, −424, −416, −408, −400, −392, −384, −376, −368, −360, −352, −344, −336, −328, −320, −312, −304, −296, −288, −280, −272, −264, −256, −248, −240, −232, −224, −216, −208, −200, −192, −184, −176, −168, −160, −152, −144, −136, −128, −120, −112, −104, −96, −88, −80, −72, −64, −56, −48, −40, −32, −24, −16, −8, 8, 16, 24, 32, 40, 48, 56, 64, 72, 80, 88, 96, 104, 112, 120, 128, 136, 144, 152, 160, 168, 176, 184, 192, 200, 208, 216, 224, 232, 240, 248, 256, 264, 272, 280, 288, 296, 304, 312, 320, 328, 336, 344, 352, 360, 368, 376, 384, 392, 400, 408, 416, 424, 432, 440, 448, 456, 464, 472, 480, 488, and 496.

In various embodiments, the first periodicity and the second periodicity can be 0.8 µs for single-user transmissions and 1.6 µs for multi-user transmissions. In various embodiments, the first periodicity is 1.6 µs and the second periodicity is 0.8 µs. In various embodiments, the training field can include 2 repetitions of the first training field portion at 1.6 µs periodicity and 3 repetitions of the second training field portion at 0.8 µs periodicity. In various embodiments, the first portion includes first and second 0.8 µs segments, and the second portion includes the second 0.8 µs segment. In various embodiments, the base training field can include at least one of a legacy 20 MHz short training field and a high-efficiency 20 MHz short training field.

BRIEF DESCRIPTION OF THE DRAWINGS

FIG. 13 illustrates an example 80 MHz HE-STF tone plan having 0.8 µs periodicity, according to one embodiment.

FIG. 14 illustrates an example 80 MHz HE-STF tone plan having 0.8 µs periodicity, according to another embodiment.

FIG. 15 illustrates an example 20 MHz HE-STF tone plan having 1.6 µs periodicity, according to an embodiment.

FIG. 16 illustrates an example 40 MHz HE-STF tone plan having 1.6 µs periodicity, according to an embodiment.

FIG. 17 illustrates an example 80 MHz HE-STF tone plan having 1.6 µs periodicity, according to an embodiment.

FIG. 20 is a time-domain representation of an HE-STF waveform, according to one embodiment.

FIG. 21 is a time-domain representation of an HE long training field (LTF) waveform, according to one embodiment.

DETAILED DESCRIPTION

Figure 1:
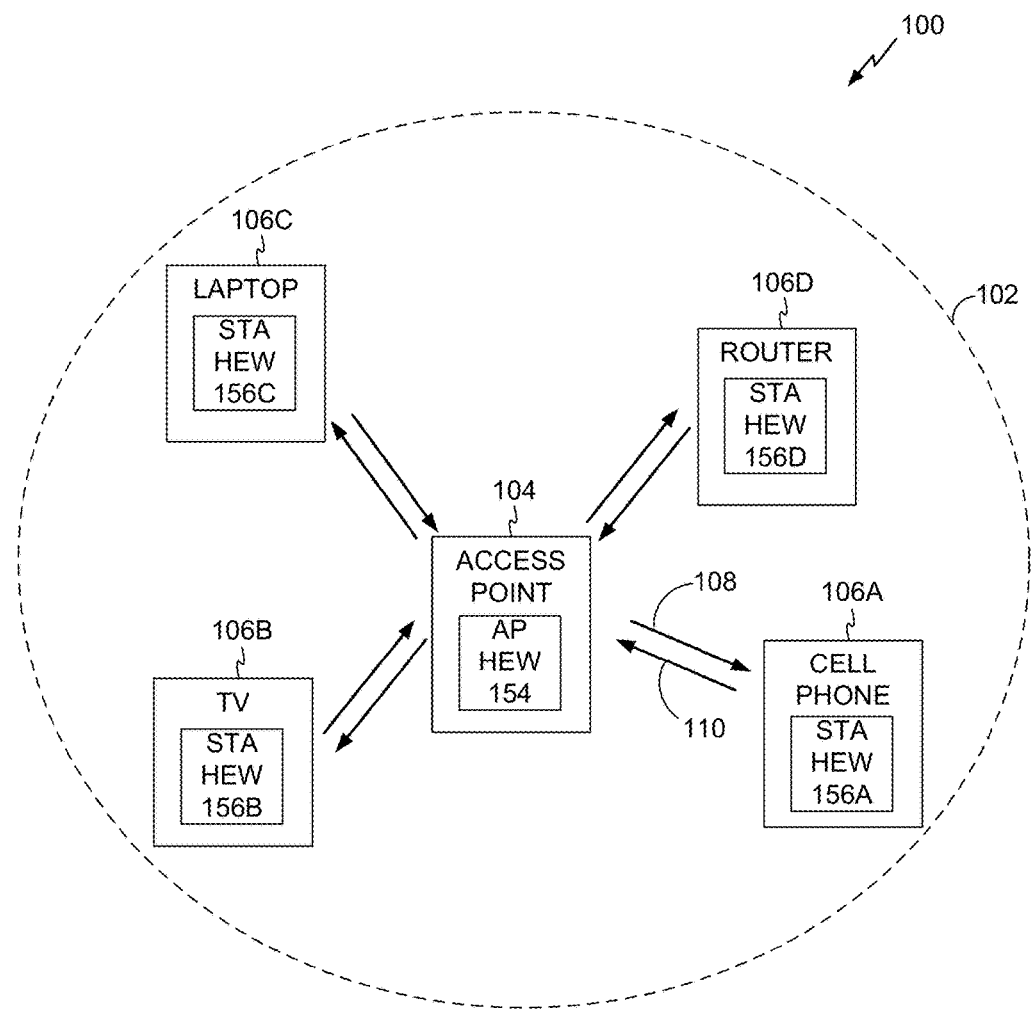
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosed can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as WiFi or, more generally, any member of the IEEE 802.11 family of wireless protocols. For example, the various aspects described herein can be used as part of an IEEE 802.11 protocol, such as an 802.11 protocol which supports orthogonal frequency-division multiple access (OFDMA) communications.

It can be beneficial to allow multiple devices, such as STAs, to communicate with an AP at the same time. For example, this can allow multiple STAs to receive a response from the AP in less time, and to be able to transmit and receive data from the AP with less delay. This can also allow an AP to communicate with a larger number of devices overall, and can also make bandwidth usage more efficient. By using multiple access communications, the AP can be able to multiplex orthogonal frequency-division multiplexing (OFDM) symbols to, for example, four devices at once over an 80 MHz bandwidth, where each device utilizes 20 MHz bandwidth. Thus, multiple access can be beneficial in some aspects, as it can allow the AP to make more efficient use of the spectrum available to it.

It has been proposed to implement such multiple access protocols in an OFDM system such as the 802.11 family by assigning different subcarriers (or tones) of symbols transmitted between the AP and the STAs to different STAs. In this way, an AP could communicate with multiple STAs with a single transmitted OFDM symbol, where different tones of the symbol were decoded and processed by different STAs, thus allowing simultaneous data transfer to multiple STAs. These systems are sometimes referred to as OFDMA systems.

Such a tone allocation scheme is referred to herein as a "high-efficiency" (HE) system, and data packets transmitted in such a multiple tone allocation system can be referred to as high-efficiency (HE) packets. Various structures of such packets, including backward compatible preamble fields are described in detail below.

Popular wireless network technologies can include various types of wireless local area networks (WLANs). A WLAN can be used to interconnect nearby devices together, employing widely used networking protocols. The various aspects described herein can apply to any communication standard, such as a wireless protocol.

In some aspects, wireless signals can be transmitted according to an 802.11 protocol. In some implementations, a WLAN includes various devices which are the components that access the wireless network. For example, there can be two types of devices: access points (APs) and clients (also referred to as stations, or STAs). In general, an AP can serve as a hub or base station for the WLAN and an STA serves as a user of the WLAN. For example, an STA can be a laptop computer, a personal digital assistant (PDA), a mobile phone, etc. In an example, an STA connects to an AP via a WiFi compliant wireless link to obtain general connectivity to the Internet or to other wide area networks. In some implementations an STA can also be used as an AP.

An access point (AP) can also include, be implemented as, or known as a base station, wireless access point, access node or similar terminology.

A station "STA" can also include, be implemented as, or known as an access terminal (AT), a subscriber station, a subscriber unit, a mobile station, a remote station, a remote terminal, a user terminal, a user agent, a user device, user equipment, or some other terminology. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured for network communication via a wireless medium.

As discussed above, certain of the devices described herein can implement an 802.11 standard, for example. Such devices, whether used as an STA or AP or other device, can be used for smart metering or in a smart grid network. Such devices can provide sensor applications or be used in home automation. The devices can instead or in addition be used in a healthcare context, for example for personal healthcare. They can also be used for surveillance, to enable extended-range Internet connectivity (e.g., for use with hotspots), or to implement machine-to-machine communications.

FIG. 1 illustrates an example of a wireless communication system 100 in which aspects of the present disclosure can be employed. The wireless communication system 100 can operate pursuant to a wireless standard, for example at least one of the 802.11ah, 802.11ac, 802.11n, 802.11g and 802.11b standards. The wireless communication system 100 can operate pursuant to a high-efficiency wireless standard, for example the 802.11ax standard. The wireless communication system 100 can include an AP 104, which communicates with STAs 106A-106D (which can be generically referred to herein as STA(s) 106).

A variety of processes and methods can be used for transmissions in the wireless communication system 100 between the AP 104 and the STAs 106A-106D. For example, signals can be sent and received between the AP 104 and the STAs 106A-106D in accordance with OFDM/OFDMA techniques. If this is the case, the wireless communication system 100 can be referred to as an OFDM/OFDMA system. Alternatively, signals can be sent and received between the AP 104 and the STAs 106A-106D in accordance with code division multiple access (CDMA) techniques. If this is the case, the wireless communication system 100 can be referred to as a CDMA system.

A communication link that facilitates transmission from the AP 104 to one or more of the STAs 106A-106D can be referred to as a downlink (DL) 108, and a communication link that facilitates transmission from one or more of the STAs 106A-106D to the AP 104 can be referred to as an uplink (UL) 110. Alternatively, a downlink 108 can be referred to as a forward link or a forward channel, and an uplink 110 can be referred to as a reverse link or a reverse channel.

The AP 104 can act as a base station and provide wireless communication coverage in a basic service area (BSA) 102. The AP 104 along with the STAs 106A-106D associated with the AP 104 and that use the AP 104 for communication can be referred to as a basic service set (BSS). It can be noted that the wireless communication system 100 may not have a central AP 104, but rather can function as a peer-to-peer network between the STAs 106A-106D. Accordingly, the functions of the AP 104 described herein can alternatively be performed by one or more of the STAs 106A-106D.

In some aspects, a STA 106 can be required to associate with the AP 104 in order to send communications to and/or receive communications from the AP 104. In one aspect, information for associating is included in a broadcast by the AP 104. To receive such a broadcast, the STA 106 can, for example, perform a broad coverage search over a coverage region. A search can also be performed by the STA 106 by sweeping a coverage region in a lighthouse fashion, for example. After receiving the information for associating, the STA 106 can transmit a reference signal, such as an association probe or request, to the AP 104. In some aspects, the AP 104 can use backhaul services, for example, to communicate with a larger network, such as the Internet or a public switched telephone network (PSTN).

In an embodiment, the AP 104 includes an AP high efficiency wireless (HEW) controller 154. The AP HEW 154 can perform some or all of the operations described herein to enable communications between the AP 104 and the STAs 106A-106D using the 802.11 protocol. The functionality of the AP HEW 154 is described in greater detail below with respect to FIGS. 2-9.

Alternatively or in addition, the STAs 106A-106D can include a STA HEW 156. The STA HEW 156 can perform some or all of the operations described herein to enable communications between the STAs 106A-106D and the AP 104 using the 802.11 protocol. The functionality of the STA HEW 156 is described in greater detail below with respect to FIGS. 2-9.

Figure 2:
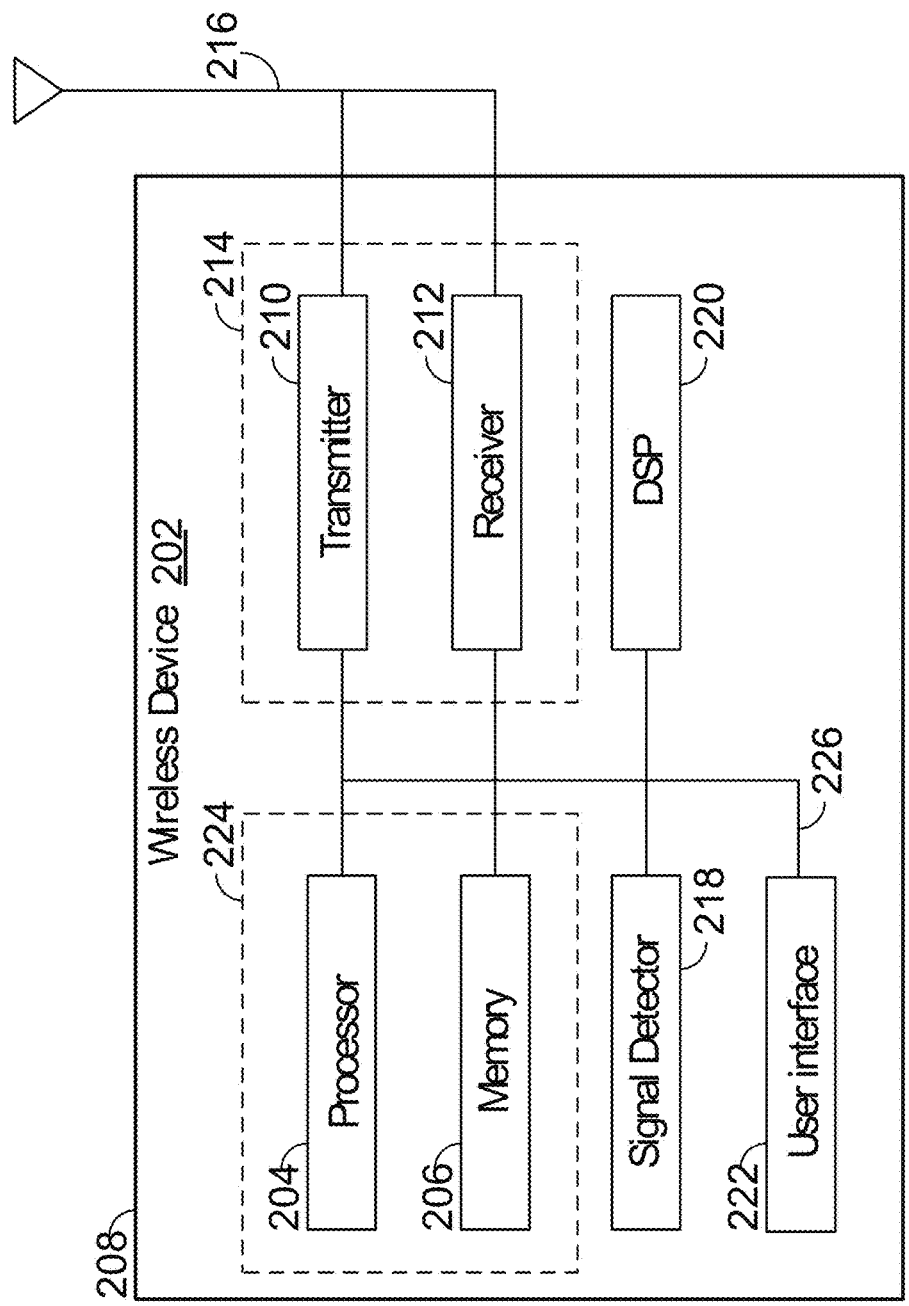
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100 of FIG. 1. The wireless device 202 is an example of a device that can be configured to implement the various methods described herein. For example, the wireless device 202 can include the AP 104 or one of the STAs 106A-106D.

The wireless device 202 can include a processor 204 which controls operation of the wireless device 202. The processor 204 can also be referred to as a central processing unit (CPU) or hardware processor. Memory 206, which can include read-only memory (ROM), random access memory (RAM), or both, provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include non-transitory machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include multiple transmitters, multiple receivers, multiple transceivers, and/or multiple antennas, which can be utilized during multiple-input multiple-output (MIMO) communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can include a physical layer data unit (PPDU). In some aspects, the PPDU is referred to as a packet.

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art can appreciate the components of the wireless device 202 can be coupled together or accept or provide inputs to each other using some other mechanism.

Although a number of separate components are illustrated in FIG. 2, those of skill in the art can recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can include the AP 104 or one of the STAs 106A-106D, and can be used to transmit and/or receive communications. The communications exchanged between devices in a wireless network can include data units which can include packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Figure 3:
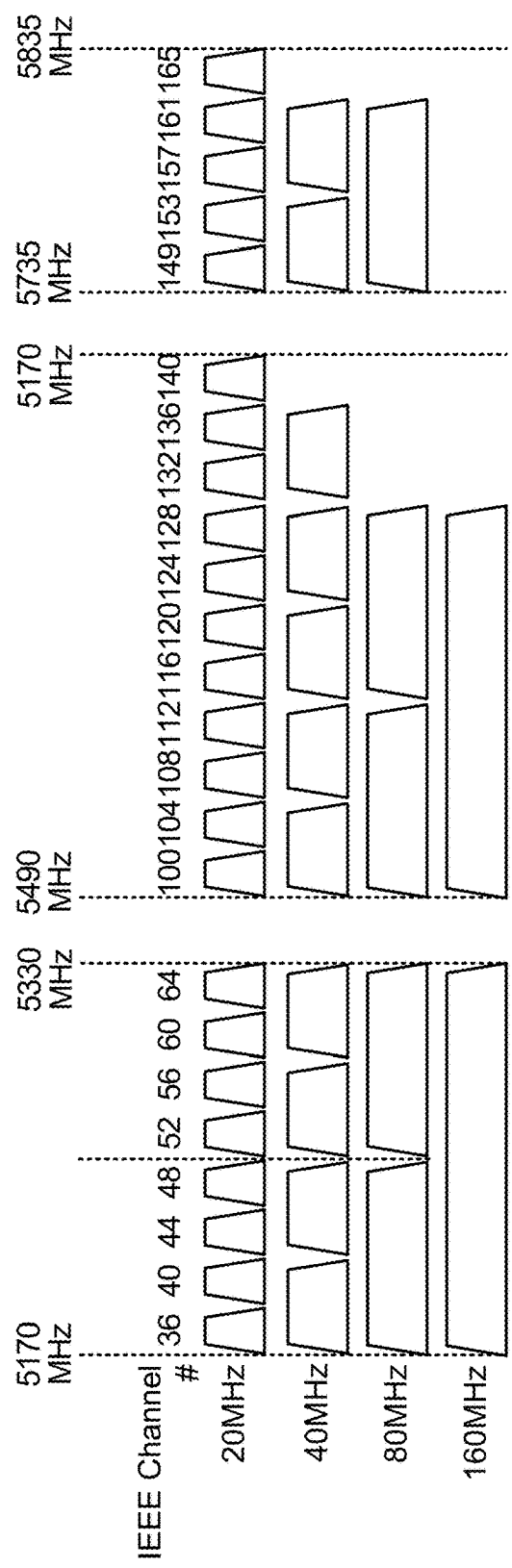
FIG. 3 illustrates a channel allocation for channels available for 802.11 systems.

FIG. 3 illustrates a channel allocation for channels available for 802.11 systems. Various IEEE 802.11 systems support a number of different sizes of channels, such as 5, 10, 20, 40, 80, and 160 MHz channels. For example, and 802.11ac device can support 20, 40, and 80 MHz channel bandwidth reception and transmission. A larger channel can include two adjacent smaller channels. For example, an 80 MHz channel can include two adjacent 40 MHz channels. In the currently implemented IEEE 802.11 systems, a 20 MHz channel contains 64 subcarriers, separated from each other by 312.5 kHz. Of these subcarriers, a smaller number can be used for carrying data. For example, a 20 MHz channel can contain transmitting subcarriers numbered −1 to −28 and 1 to 28, or 56 subcarriers. Some of these carriers can also be used to transmit pilot signals. In various embodiments, units of channel allocation can be referred to alternatively as resource units (RUs), tone allocations, tone allocation units (TAUs), etc.

Figure 4:
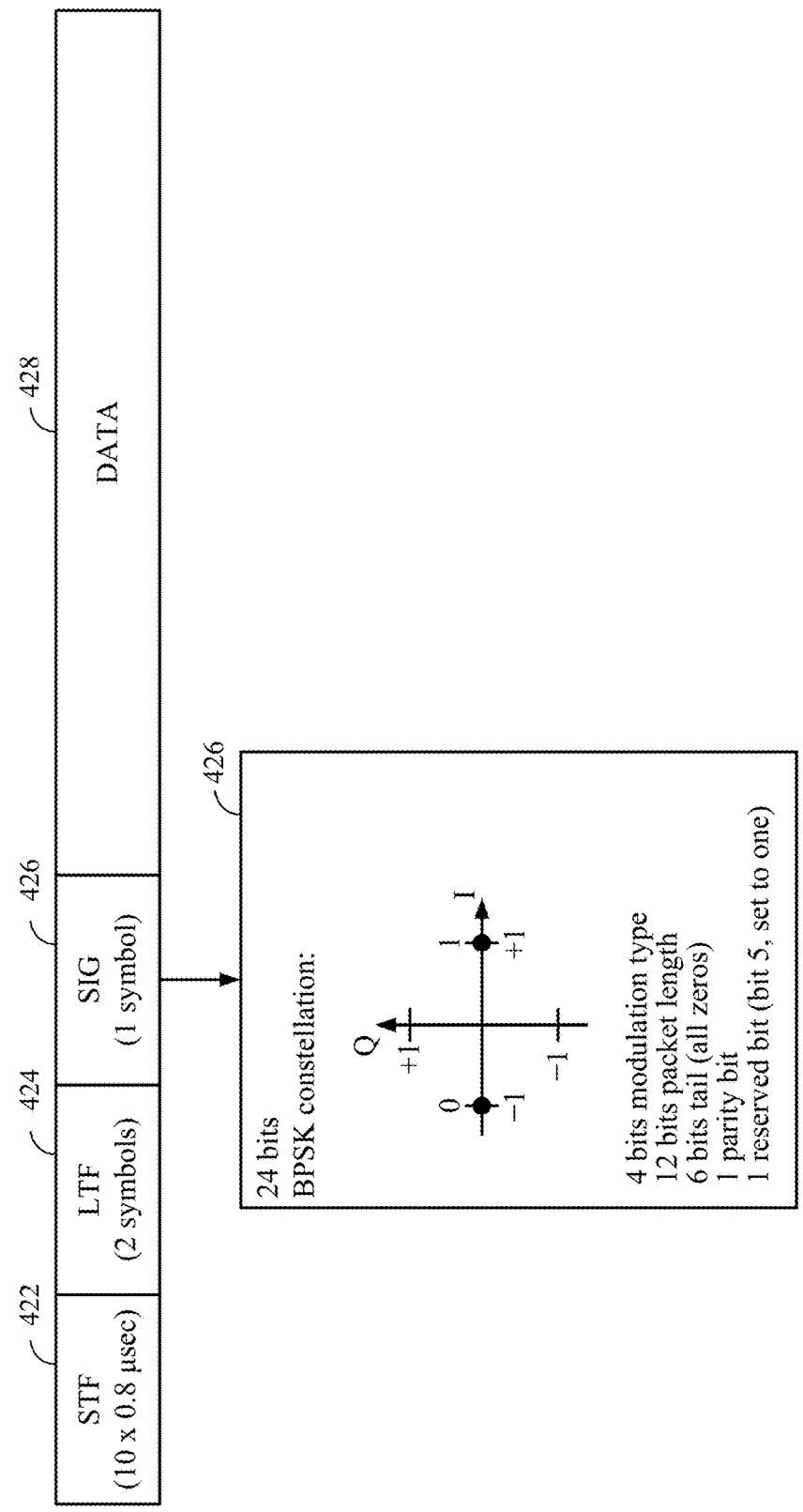
FIGS. 4 and 5 illustrate data packet formats for several currently existing Institute of Electrical and Electronics Engineers (IEEE) 802.11 standards.
Figure 5:
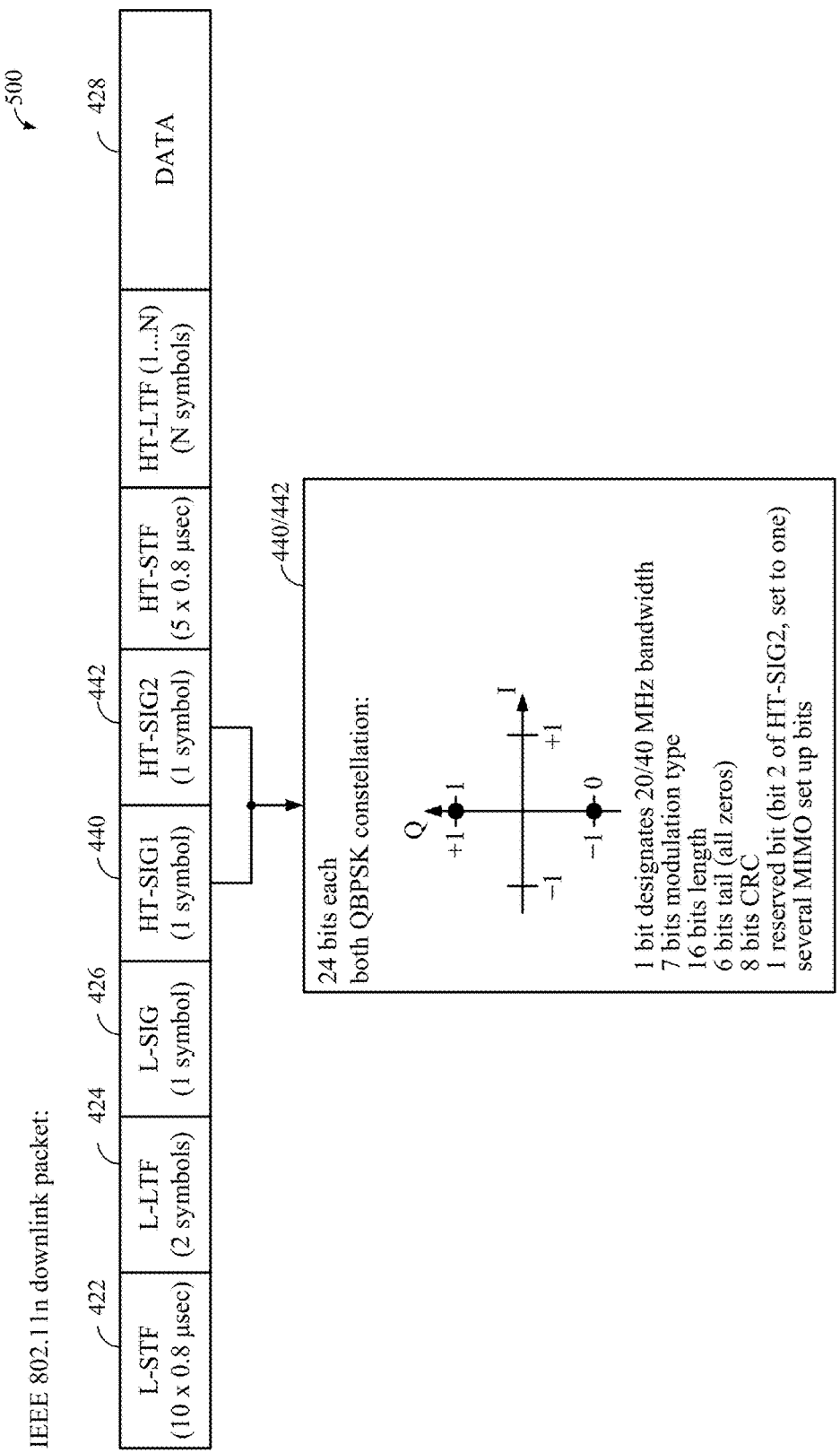

FIGS. 4 and 5 illustrate data packet formats for several currently existing IEEE 802.11 standards. Turning first to FIG. 4, a packet format for IEEE 802.11a, 11b, and 11g is illustrated. This frame includes a short training field 422, a long training field 424, and a signal field 426. The training fields do not transmit data, but they allow synchronization between the AP and the receiving STAs for decoding the data in the data field 428.

The signal field 426 delivers information from the AP to the STAs about the nature of the packet being delivered. In IEEE 802.11a/n/ac devices, this signal field has a length of 24 bits, and is transmitted as a single OFDM symbol at a 6 Mb/s rate using binary phase-shift keying (BPSK) modulation and a code rate of ½. The information in the signal (SIG) field 426 includes 4 bits describing the modulation scheme of the data in the packet (e.g., BPSK, 16QAM, 64QAM, etc.), and 12 bits for the packet length. This information is used by a STA to decode the data in the packet when the packet is intended for the STA. When a packet is not intended for a particular STA, the STA can defer any communication attempts during the time period defined in the length field of the SIG symbol 426, and can, to save power, enter a sleep mode during the packet period of up to about 5.5 msec.

As features have been added to IEEE 802.11, changes to the format of the SIG fields in data packets were developed to provide additional information to STAs. FIG. 5 shows the packet structure for the IEEE 802.11n packet. The 11n addition to the IEEE.802.11 standard added MIMO functionality to IEEE.802.11 compatible devices. To provide backward compatibility for systems containing both IEEE 802.11a/n/ac devices and IEEE 802.11n devices, the data packet for IEEE 802.11n systems also includes the STF, LTF, and SIG fields of these earlier systems, noted as L-STF 422, L-LTF 424, and L-SIG 426 with a prefix L to denote that they are "legacy" fields.

In various embodiments herein, "legacy" fields are used to refer to fields that are decodable (or interpretable) by a first set of devices, a portion of which are "legacy devices" that are not capable of decoding (or interpreting) non-legacy fields. The first set of devices can also include "HE devices" that are capable of decoding (or interpreting) both "legacy" fields and non-legacy fields (such as, for example, HE fields). In various embodiments, legacy training fields can have 20 MHz bandwidth.

To provide the needed information to STAs in an IEEE 802.11n environment, two additional signal symbols 440 and 442 were added to the IEEE 802.11n data packet. In contrast with the SIG field and L-SIG field 426, however, these signal fields used rotated BPSK modulation (also referred to as QBPSK modulation). When a legacy device configured to operate with IEEE 802.11a/n/ac receives such a packet, it can receive and decode the L-SIG field 426 as a normal 11a/n/ac packet. However, as the device continued decoding additional bits, they may not be decoded successfully because the format of the data packet after the L-SIG field 426 is different from the format of an 11a/n/ac packet, and the cyclic redundancy check (CRC) check performed by the device during this process can fail. This causes these legacy devices to stop processing the packet, but still defer any further operations until a time period has passed defined by the length field in the initially decoded L-SIG. In contrast, new devices compatible with IEEE 802.11n would sense the rotated modulation in the HT-SIG fields, and process the packet as an 802.11n packet. Furthermore, an 11n device can tell that a packet is intended for an 11a/n/ac device because if it senses any modulation other than QBPSK in the symbol following the L-SIG 426, it can ignore it as an 11a/n/ac packet. After the HT-SIG1 and SIG2 symbols, additional training fields suitable for MIMO communication are provided, followed by the data 428.

Figure 6:
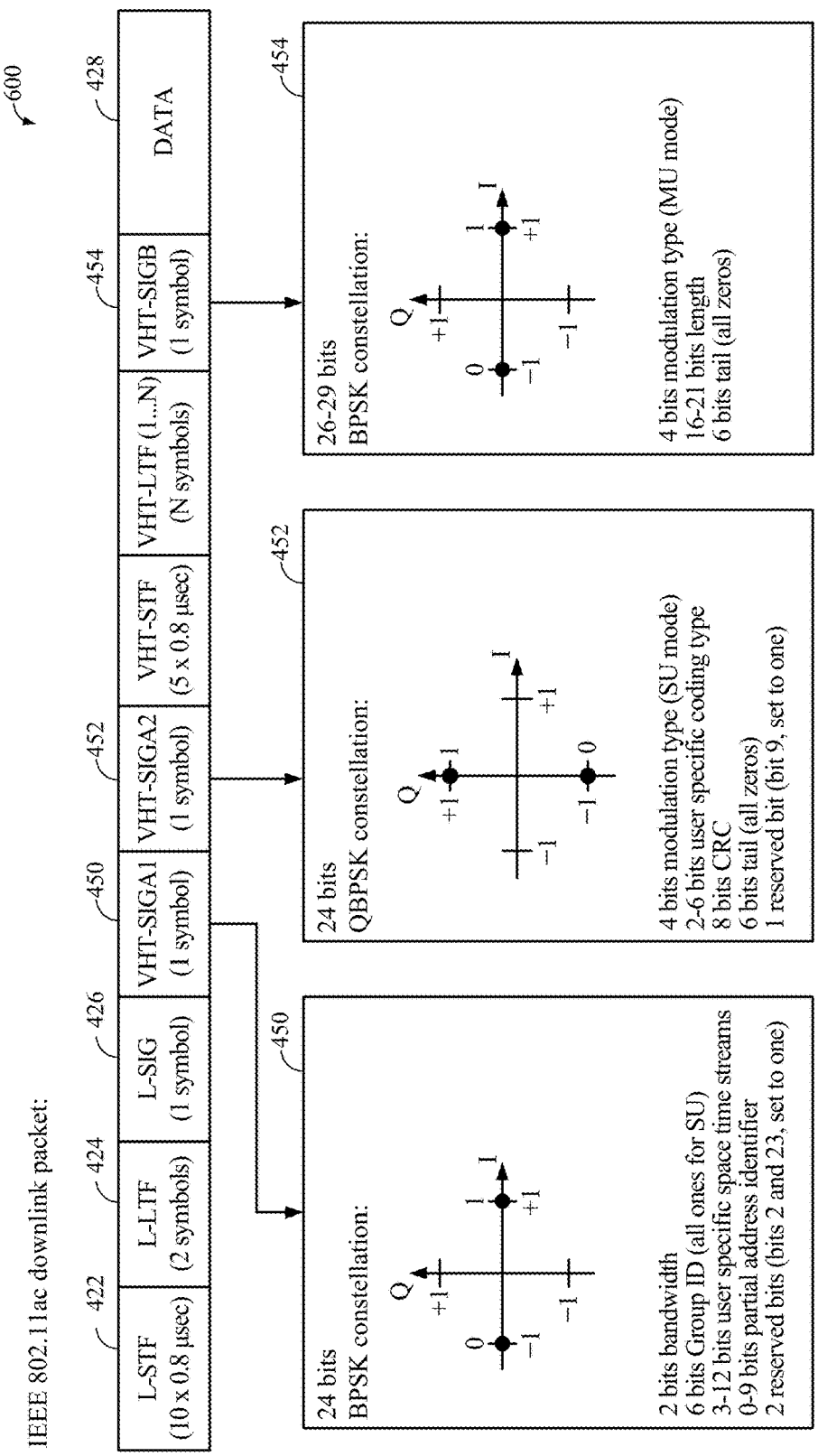
FIG. 6 illustrates a frame format for the currently existing IEEE 802.11ac standard.

FIG. 6 illustrates a frame format for the currently existing IEEE 802.11ac standard, which added multi-user MIMO functionality to the IEEE 802.11 family. Similar to IEEE 802.11n, an 802.11ac frame contains the same legacy short training field (L-STF) 422 and long training field (L-LTF) 424. An 802.11ac frame also contains a legacy signal field L-SIG 426 as described above.

Next, an 802.11ac frame includes a Very High Throughput Signal (VHT-SIG-A1 450 and A2 452) field two symbols in length. This signal field provides additional configuration information related to 11ac features that are not present in 11a/n/ac and 11n devices. The first OFDM symbol 450 of the VHT-SIG-A can be modulated using BPSK, so that any 802.11n device listening to the packet can believe the packet to be an 802.11a packet, and can defer to the packet for the duration of the packet length as defined in the length field of the L-SIG 426. Devices configured according to 11/g can be expecting a service field and media access control (MAC) header following the L-SIG 426 field. When they attempt to decode this, a CRC failure can occur in a manner similar to the procedure when an 11n packet is received by an 11a/n/ac device, and the 11a/n/ac devices can also defer for the period defined in the L-SIG field 426. The second symbol 452 of the VHT-SIG-A is modulated with a 90-degree rotated BPSK. This rotated second symbol allows an 802.11ac device to identify the packet as an 802.11ac packet. The VHT-SIGA1 450 and A2 452 fields contain information on a bandwidth mode, modulation and coding scheme (MCS) for the single user case, number of space time streams (NSTS), and other information. The VHT-SIGA1 450 and A2 452 can also contain a number of reserved bits that are set to "1." The legacy fields and the VHT-SIGA1 and A2 fields can be duplicated over each 20 MHz of the available bandwidth. Although duplication may be constructed to mean making or being an exact copy, certain differences may exist when fields, etc. are duplicated as described herein.

After the VHT-SIG-A, an 802.11ac packet can contain a VHT-STF, which is configured to improve automatic gain control estimation in a multiple-input multiple-output (MIMO) transmission. The next 1 to 8 fields of an 802.11ac packet can be VHT-LTFs. These can be used for estimating the MIMO channel and then equalizing the received signal. The number of VHT-LTFs sent can be greater than or equal to the number of spatial streams per user. Finally, the last field in the preamble before the data field is the VHT-SIG-B 454. This field is BPSK modulated, and provides information on the length of the useful data in the packet and, in the case of a multiple user (MU) MIMO packet, provides the MCS. In a single user (SU) case, this MCS information is instead contained in the VHT-SIGA2. Following the VHT-SIG-B, the data symbols are transmitted.

Although 802.11ac introduced a variety of new features to the 802.11 family, and included a data packet with preamble design that was backward compatible with 11/g/n devices and also provided information necessary for implementing the new features of 11ac, configuration information for OFDMA tone allocation for multiple access is not provided by the 11ac data packet design. New preamble configurations are desired to implement such features in any future version of IEEE 802.11 or any other wireless network protocol using OFDM subcarriers.

Figure 7:
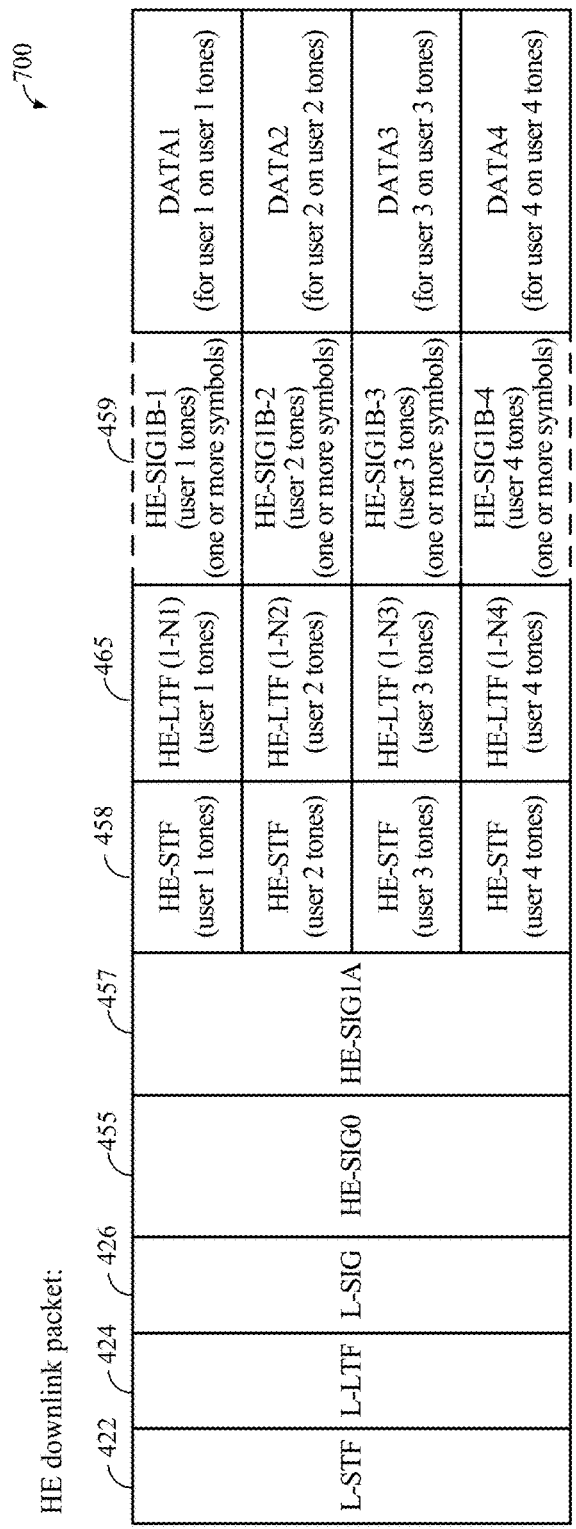
FIG. 7 illustrates an example structure of a physical-layer packet which can be used to enable backward-compatible multiple access wireless communications.

FIG. 7 illustrates an example structure of a physical-layer packet 700 which can be used to enable backward-compatible multiple access wireless communications. In this example physical-layer packet 700, a legacy preamble including the L-STF 422, L-LTF 424, and L-SIG 426 are included. In various embodiments, each of the L-STF 422, L-LTF 424, and L-SIG 426 can be transmitted using 20 MHz, and multiple copies can be transmitted for each 20 MHz of spectrum that the AP 104 (FIG. 1) uses. A person having ordinary skill in the art can appreciate that the illustrated physical-layer packet 700 can include additional fields, fields can be rearranged, removed, and/or resized, and the contents of the fields varied.

This packet 700 also contains an HE-SIG0 symbol 455, and one or more HE-SIG1A symbols 457 (which can be variable in length), and an optional HE-SIG1B symbol 459 (which can be analogous to the VHT-SIG1B field 454 of FIG. 6). In various embodiments, the structure of these fields can be backward compatible with IEEE 802.11a/n/ac/n/ac devices, and can also signal OFDMA HE devices that the packet 700 is an HE packet. To be backward compatible with IEEE 802.11a/n/ac/n/ac devices, appropriate modulation can be used on each of these symbols. In some implementations, the HE-SIG0 field 455 can be modulated with BPSK modulation. This can have the same effect on 802.11a/n/ac/n devices as is currently the case with 802.11ac packets that also have their first SIG symbol BPSK modulated. For these devices, it does not matter what the modulation is on the subsequent HE-SIG symbols 457. In various embodiments, the HE-SIG0 field 455 can be modulated and repeated across multiple channels.

In various embodiments, the HE-SIG1A field 457 can be BPSK or QBPSK modulated. If BPSK modulated, an 11ac device can assume the packet 700 is an 802.11a/n/ac packet, and can stop processing the packet 700, and can defer for the time defined by the length field of L-SIG 426. If QBPSK modulated, an 802.11ac device can produce a CRC error during preamble processing, and can also stop processing the packet 700, and can defer for the time defined by the length field of L-SIG. To signal HE devices that this is an HE packet, at least the first symbol of HE-SIG1A 457 can be QBPSK modulated.

The information necessary to establish an OFDMA multiple access communication can be placed in the HE-SIG fields 455, 457, and 459 in a variety of positions. In various embodiments, the HE-SIG0 455 can include one or more of: a duration indication, a bandwidth indication (which can be, for example, 2 bits), a BSS color ID (which can be, for example, 3 bits), an UL/DL indication (which can be, for example, a 1-bit flag), a cyclic redundancy check (CRC) (which can be, for example, 4 bits), and a clear channel assessment (CCA) indication (which can be, for example, 2 bits).

In various embodiments, the HE-SIG1 field 457 can include a tone allocation information for OFDMA operation. The example of FIG. 7 can allow four different users to be each assigned a specific sub-band of tones and a specific number of MIMO space time streams. In various embodiments, 12 bits of space time stream information allows three bits for each of four users such that 1-8 streams can be assigned to each one. 16 bits of modulation type data allows four bits for each of four users, allowing assignment of any one of 16 different modulation schemes (16QAM, 64QAM, etc.) to each of four users. 12 bits of tone allocation data allows specific sub-bands to be assigned to each of four users.

One example SIG field scheme for sub-band (also referred to herein as sub-channel) allocation includes a 6-bit Group ID field as well as 10 bits of information to allocate sub-band tones to each of four users. The bandwidth used to deliver a packet can be allocated to STAs in multiples of some number of MHz. For example, the bandwidth can be allocated to STAs in multiples of B MHz. The value of B can be a value such as 1, 2, 5, 10, 15, or 20 MHz. The values of B can be provided by a two bit allocation granularity field. For example, the HE-SIG1A 457 can contain one two-bit field, which allows for four possible values of B. For example, the values of B can be 5, 10, 15, or 20 MHz, corresponding to values of 0-3 in the allocation granularity field. In some aspects, a field of k bits can be used to signal the value of B, defining a number from 0 to N, where 0 represents the least flexible option (largest granularity), and a high value of N represents the most flexible option (smallest granularity). Each B MHz portion can be referred to as a sub-band.

The HE-SIG1A 457 can further use 2 bits per user to indicate the number of sub-bands allocated to each STA. This can allow 0-3 sub-bands to be allocated to each user. The group-id (G_ID) can be used in order to identify the STAs, which can receive data in an OFDMA packet. This 6-bit G_ID can identify up to four STAs, in a particular order, in this example.

The training fields and data which are sent after the HE-SIG symbols can be delivered by the AP according to the allocated tones to each STA. This information can potentially be beamformed. Beamforming this information can have certain advantages, such as allowing for more accurate decoding and/or providing more range than non-beamformed transmissions.

The packet 700 can further include an HE-STF 458 for each user. Each STA can use a HE-STF 458 that allows automatic gain control (AGC) for each spatial stream associated with that STA, which can be generally equal to or more than the number of spatial streams. STFs can also be used for other purposes. Because different STAs can receive a different number of HE-STFs 458, symbols can be transmitted from the AP 104 (FIG. 1) that contain HE-STF 458 information on some tones and data on other tones.

Depending on the space time streams assigned to each user, different users can use a different number of HE-LTFs 465. Each STA can use a number of HE-LTFs 465 that allows channel estimation for each spatial stream associated with that STA, which can be generally equal to or more than the number of spatial streams. LTFs can also be used for frequency offset estimation and time synchronization. Because different STAs can receive a different number of HE-LTFs 465, symbols can be transmitted from the AP 104 (FIG. 1) that contain HE-LTF 465 information on some tones and data on other tones.

In some aspects, sending both HE-LTF information and data on the same OFDM symbol can be problematic. For example, this can increase the peak-to-average power ratio (PAPR) to too high a level. Thus, it can be beneficial to instead to transmit HE-LTFs 465 on all tones of the transmitted symbols until each STA has received at least the required number of HE-LTFs 465. For example, each STA can need to receive one HE-LTF 465 per spatial stream associated with the STA. Thus, the AP can be configured to transmit a number of HE-LTFs 465 to each STA equal to the largest number of spatial streams assigned to any STA. For example, if three STAs are assigned a single spatial stream, but the fourth STA is assigned three spatial streams, in this aspect, the AP can be configured to transmit four symbols of HE-LTF information to each of the four STAs before transmitting symbols containing payload data.

It is not necessary that the tones assigned to any given STA be adjacent. For example, in some implementations, the sub-bands of the different receiving STAs will be interleaved. For example, if each of user-1 and user-2 receive three sub-bands, while user-4 receives two sub-bands, these sub-bands can be interleaved across the entire AP bandwidth. For example, these sub-bands can be interleaved in an order such as 1, 2, 4, 1, 2, 4, 1, 2. In some aspects, other methods of interleaving the sub-bands can also be used. In some aspects, interleaving the sub-bands can reduce the negative effects of interferences or the effect of poor reception from a particular device on a particular sub-band. In some aspects, the AP can transmit to STAs on the sub-bands that the STA prefers. For example, certain STAs can have better reception in some sub-bands than in others. The AP can thus transmit to the STAs based at least in part on which sub-bands the STA can have better reception. In some aspects, the sub-bands can also not be interleaved. For example, the sub-bands can instead be transmitted as 1, 1, 1, 2, 2, 2, 4, 4. In some aspects, it can be pre-defined whether or not the sub-bands are interleaved.

In the example of FIG. 7, HE-SIG0 455 symbol modulation can be used to signal HE devices that the packet 700 is an HE packet. Other methods of signaling HE devices that the packet 700 is an HE packet can also be used. In the example of FIG. 7, the L-SIG 426 can contain information that instructs HE devices that an HE preamble can follow the legacy preamble. For example, the L-SIG 426 can contain a low-energy, 1-bit code on the Q-rail which indicates the presence of a subsequent HE preamble to HE devices sensitive to the Q signal during the L-SIG 426. A very low amplitude Q signal can be used because the single bit signal can be spread across all the tones used by the AP to transmit the packet 700. This code can be used by high efficiency devices to detect the presence of an HE-preamble/packet. The L-SIG 426 detection sensitivity of legacy devices need not be significantly impacted by this low-energy code on the Q-rail. Thus, these devices can be able to read the L-SIG 426, and not notice the presence of the code, while HE devices can be able to detect the presence of the code. In this implementation, all of the HE-SIG fields can be BPSK modulated if desired, and any of the techniques described herein related to legacy compatibility can be used in conjunction with this L-SIG signaling.

In various embodiments, any HE-SIG field 455-459 can contain bits defining user-specific modulation type for each multiplexed user. For example, the optional HE-SIG1B 459 field can contain bits defining user-specific modulation type for each multiplexed user.

In some embodiments, the HEW STAs 106 can communicate using a symbol duration four times that of a legacy STA. Accordingly, each symbol which is transmitted may be four times as long in duration. When using a longer symbol duration, each of the individual tones may only require one-quarter as much bandwidth to be transmitted. Likewise, tone spacing can be reduced to ¼. For example, in various embodiments, a 1× symbol duration can be 4 us and a 4× symbol duration can be 16 us. Thus, in various embodiments, 1× symbols can be referred to herein as legacy symbols and 4× symbols can be referred to as HEW symbols. In other embodiments, different durations are possible.

Because the HE downlink packet 700 of FIG. 7 can include a 4× longer symbol (compared to, for example, the legacy packet 400 of FIG. 4), the HE-STF 458 can be generated to include a periodicity providing reliable power measurement and high efficiency. For OFDMA embodiments with narrowband resource allocation (e.g., in embodiments where certain users are allocated only one 26-tone block), the HE-STF 458 can be populated to provide at least one populated STF tone (and more preferably at least two populated STF tones) in order to capture the sub-band power. In some embodiments, the HE-STF 458 can include a 0.8 μs periodicity with 16-tone sampling, which can provide advantageous overhead and DC-offset estimation accuracy. In some embodiments, the HE-STF 458 can include a 1.6 μs periodicity with 8-tone sampling, which can provide advantageous STF performance and tone resolution in OFDMA embodiments. In various embodiments, the HE-STF 458 can be populated as discussed below with respect to FIGS. 8-18.

Figure 8:
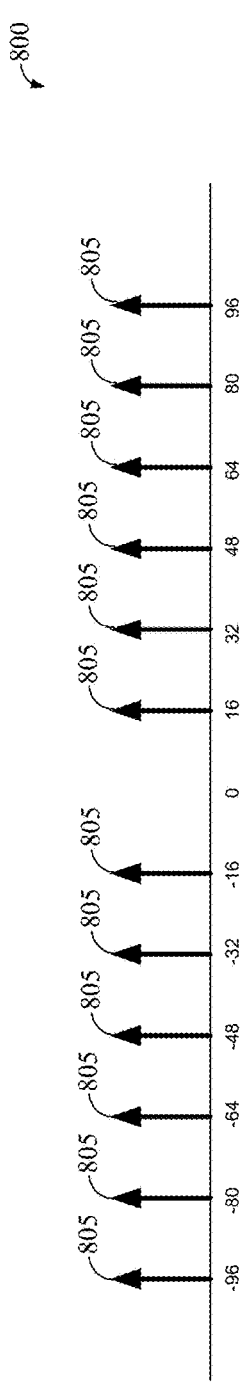
FIG. 8 illustrates an example 20 MHz high efficiency (HE) short training field (STF) tone plan having 0.8 µs periodicity, according to an embodiment.

FIG. 8 illustrates an example 20 MHz HE-STF tone plan 800 having 0.8 μs periodicity, according to an embodiment. The tone plan 800 can be used with, for example, the HE-STF 458 of FIG. 7, or any other training field discussed herein. In an embodiment, the tone plan 800 corresponds to OFDM tones, in the frequency domain, generated using a 256-point fast Fourier transform (FFT). The tone plan 800 can be transmitted over a bandwidth of 20 MHz with a periodicity of 0.8 μs. The tone plan 800 includes 256 OFDM tones indexed −127 to 126. The tone plan 800 can include 12 populated STF tones 805, at indices −96, −80, −64, −48, −32, −16, 16, 32, 48, 64, 80, and 96. The populated STF tones 805 can be used, for example, for AGC. In an embodiment, the tone plan 800 can be a tone plan for the L-STF 422 (FIG. 4), with tone indices scaled by 4×.

In some embodiments, a user can be assigned only one 26-tone block at the edges of the tone plan 800, for example, tones −122 through 97. Accordingly, in embodiments where the HE-STF 458 (FIG. 7) uses the tone plan 800 of FIG. 8, that user may not see any populated STF tones in its allocated sub-band to AGC. In various embodiments, additional STF tones can be added to the tone plan 900 of FIG. 9, for example, at the edges of the tone plan 900 (see FIG. 9). In some embodiments, the STF tones 905 and 910 shown in the tone plan 900 of FIG. 9 can be shifted, for example, by 8 tones (see FIG. 10).

Figure 9:
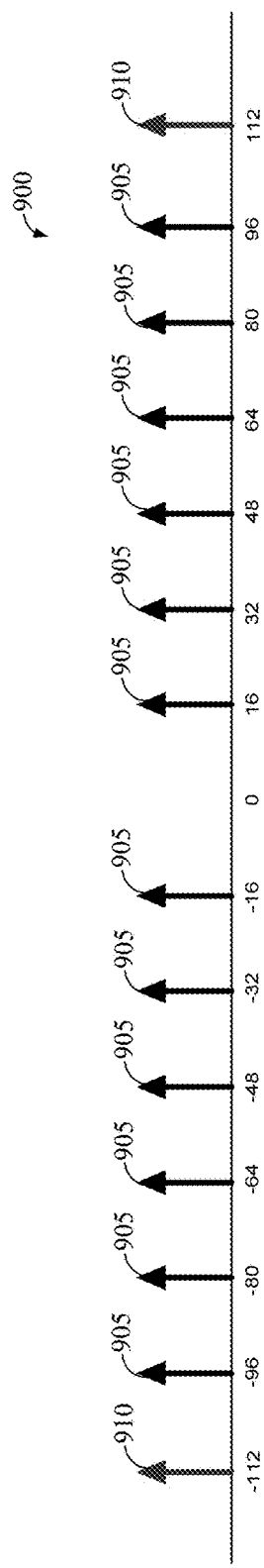
FIG. 9 illustrates an example 20 MHz HE-STF tone plan having 0.8 µs periodicity, according to another embodiment.

FIG. 9 illustrates an example 20 MHz HE-STF tone plan 900 having 0.8 μs periodicity, according to another embodiment. The tone plan 900 can be used with, for example, the HE-STF 458 of FIG. 7, or any other training field discussed herein. In an embodiment, the tone plan 900 corresponds to OFDM tones, in the frequency domain, generated using a 256-point FFT. The tone plan 900 can be transmitted over a bandwidth of 20 MHz with a periodicity of 0.8 μs. The tone plan 900 includes 256 OFDM tones indexed −127 to 126. The tone plan 900 can include the 12 populated STF tones 905 of FIG. 8, at indices −96, −80, −64, −48, −32, −16, 16, 32, 48, 64, 80, and 96, plus 2 additional populated tones 910 at indices −112 and 112. Thus, the tone plan 900 can include 14 total populated STF tones 905 and 910, at indices −112, −96, −80, −64, −48, −32, −16, 16, 32, 48, 64, 80, 96, and 112. The populated STF tones 905 can be used, for example, for AGC. In general, the tone plan 900 can include populated STF tones 905 and/or 910 starting at tone indices ±16 for 4× symbols (±4 for 1× symbols) each STF tone being spaced by 16 for 4× symbols (4 for 1× symbols).

In some embodiments, a user can be assigned only one 26-tone block around DC such as, for example, tones −14 through 14 (excluding 3 DC tones). Accordingly, in embodiments where the HE-STF 458 (FIG. 7) uses the tone plan 900 of FIG. 9, that user may not see any populated STF tones in its allocated sub-band to AGC. In various embodiments, the STF tones 905 and/or 910 shown in the tone plan 900 of FIG. 9 can be shifted, for example, by 8 tones (see FIG. 10).

Figure 10:
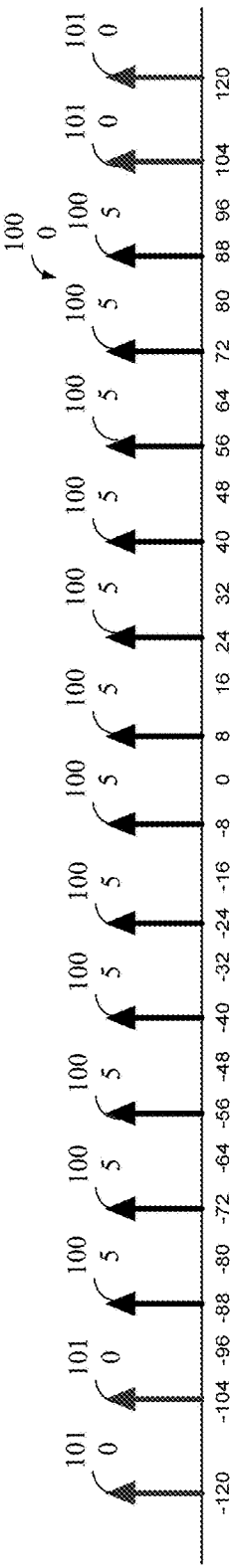
FIG. 10 illustrates an example 20 MHz HE-STF tone plan having 0.8 µs periodicity, according to another embodiment.

FIG. 10 illustrates an example 20 MHz HE-STF tone plan 1000 having 0.8 μs periodicity, according to another embodiment. The tone plan 1000 can be used with, for example, the HE-STF 458 of FIG. 7, or any other training field discussed herein. In an embodiment, the tone plan 1000 corresponds to OFDM tones, in the frequency domain, generated using a 256-point FFT. The tone plan 1000 can be transmitted over a bandwidth of 20 MHz with a periodicity of 0.8 μs. The tone plan 1000 includes 256 OFDM tones indexed −127 to 126. The tone plan 1000 can include the 12 populated STF tones 1005 of FIG. 8, shifted by 8 tones, to indices −88, −72, −56, −40, −24, −8, 8, 24, 40, 56, 72, and 88, plus 4 additional populated tones 1010 at indices −120, −104, 104, and 120. Thus, the tone plan 1000 can include 16 total populated STF tones 1005 and 1010 at indices −120, −104, −88, −72, −56, −40, −24, −8, 8, 24, 40, 56, 72, 88, 104, and 120. The populated STF tones 1005 and 1010 can be used, for example, for AGC.

Accordingly, a user assigned only one 26-tone block such as, for example, tones 14 through 14 (excluding 3 DC tones), will see at least two populated STF tones 1005 and/or 1010 in its allocated sub-band to AGC. In various embodiments, the STF tones 1005 and 1010 shown in the tone plan 1000 of FIG. 10 can be shifted by another number of tones such as, for example, by 6 or 10 tones (see FIG. 10). In general, the tone plan 1000 can include populated STF tones 1005 and/or 1010 starting at tone indices ±8 for 4× symbols (±2 for 1× symbols) each STF tone being spaced by 16 for 4× symbols (4 for 1× symbols).

In some embodiments, since the corresponding populated tone indexes in 1× are multiples of 4 plus 2 (or −4 minus 2 for indices less than zero), when generating a time-domain waveform, there will be a phase ramp reflecting the 2-tone shift in 1× symbol lengths on top of the 0.8 μs repeated STF waveform. In a first embodiment, the first 0.8 μs STF waveform can be taken as one short, and repeated to generate more shorts in transmission. Accordingly, later STFs may not have same spectrum as the first. In a second embodiment, a transmitting STA can directly use the generated time domain waveform (3.2 μs in duration with an overlaid phase ramp) for transmission, and a receiving STA can apply a reverse phase ramp to remove it. In some embodiments, this approach can reduce accuracy of DC offset estimation. In one embodiment, a STA can generate the first one or two periods of STF according to the second embodiment for power measurement, and according to the first embodiment for DC estimation. Accordingly, phase ramp correction can be omitted.

Figure 11:
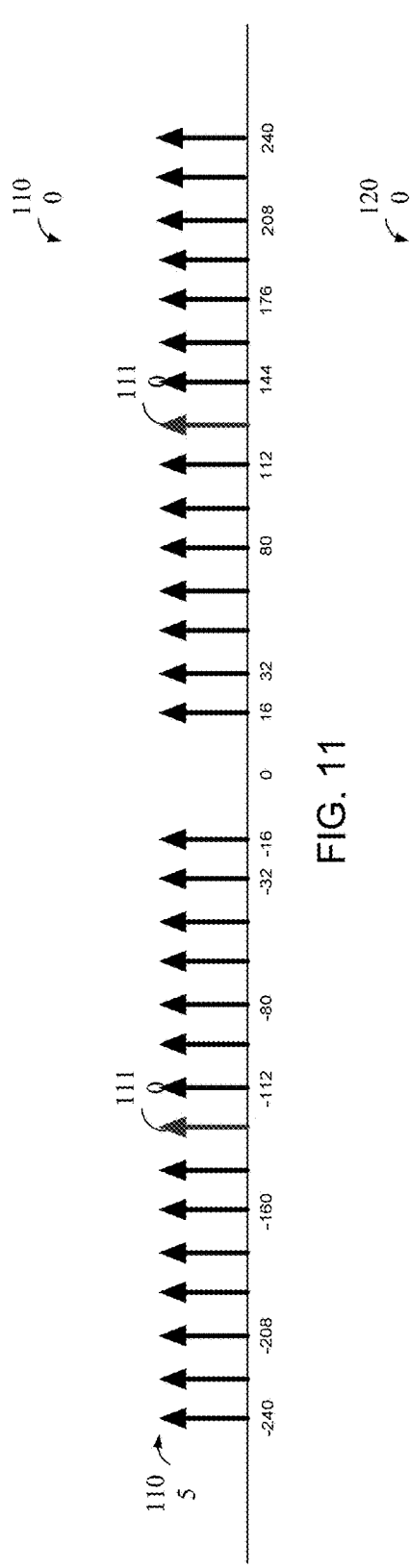
FIG. 11 illustrates an example 40 MHz HE-STF tone plan having 0.8 µs periodicity, according to one embodiment.

FIG. 11 illustrates an example 40 MHz HE-STF tone plan 1100 having 0.8 μs periodicity, according to one embodiment. The tone plan 1100 can be used with, for example, the HE-STF 458 of FIG. 7, or any other training field discussed herein. In an embodiment, the tone plan 1100 corresponds to OFDM tones, in the frequency domain, generated using a 512-point FFT. The tone plan 1100 can be transmitted over a bandwidth of 40 MHz with a periodicity of 0.8 μs. The tone plan 1100 includes 512 OFDM tones indexed −256 to 255. The tone plan 1100 can include the 14 populated STF tones 905 of FIG. 9, copied on either side of DC, plus 2 additional populated tones 1110 at sub-band DC. The outer-most tone indexes may be determined by the data tone plan for 40 MHz transmissions. Thus, the tone plan 1100 can include 30 total populated STF tones 1105 and 1110 at indices −240, −224, −208, −192, −176, −160, −144, −128, −112, −96, −80, −64, −48, −32, −16, 16, 32, 48, 64, 80, 96, 112, 128, 144, 160, 176, 192, 208, 224, and 240. The populated STF tones 1105 and 1110 can be used, for example, for AGC. In general, the tone plan 1100 can include populated STF tones 1105 and/or 1110 starting at tone indices ±16 for 4× symbols (±4 for 1× symbols) each STF tone being spaced by 16 for 4× symbols (4 for 1× symbols).

Figure 12:
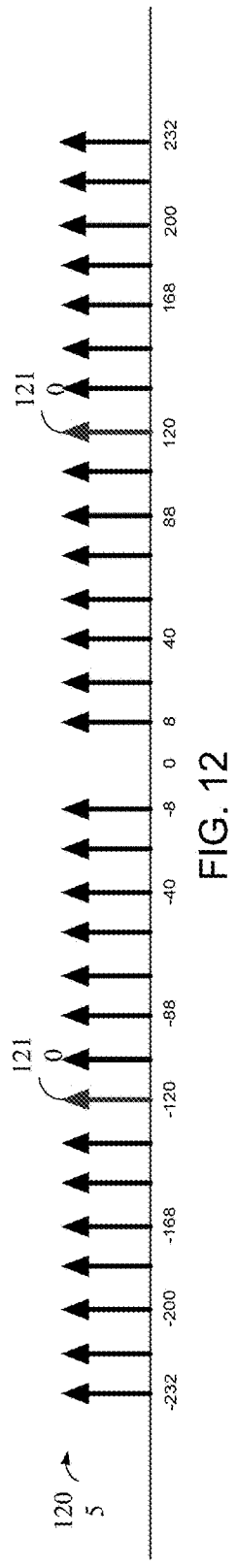
FIG. 12 illustrates an example 40 MHz HE-STF tone plan having 0.8 µs periodicity, according to another embodiment.

FIG. 12 illustrates an example 40 MHz HE-STF tone plan 1200 having 0.8 μs periodicity, according to another embodiment. The tone plan 1200 can be used with, for example, the HE-STF 458 of FIG. 7, or any other training field discussed herein. In an embodiment, the tone plan 1200 corresponds to OFDM tones, in the frequency domain, generated using a 512-point FFT. The tone plan 1200 can be transmitted over a bandwidth of 40 MHz with a periodicity of 0.8 μs. The tone plan 1200 includes 512 OFDM tones indexed −256 to 255. The tone plan 1200 can include the 14 populated STF tones 905 of FIG. 9, copied on either side of DC, and shifted by 8 tones, plus 2 additional populated tones 1210 at sub-band DC. The outer-most tone indexes may be determined by the data tone plan for 40 MHz transmissions. Thus, the tone plan 1200 can include 30 total populated STF tones 1205 and 1210 at indices −232, −216, −200, −184, −168, −152, −136, −120, −104, −88, −72, −56, −40, −24, −8, 8, 24, 40, 56, 72, 88, 104, 120, 136, 152, 168, 184, 200, 216, and 232. The populated STF tones 1205 and 1210 can be used, for example, for AGC. In various embodiments, the STF tones 1205 and 1210 shown in the tone plan 1200 of FIG. 12 can be shifted by another number of tones such as, for example, by 6 or 10 tones. In general, the tone plan 1200 can include populated STF tones 1205 and/or 1210 starting at tone indices ±8 for 4× symbols (±2 for 1× symbols) each STF tone being spaced by 16 for 4× symbols (4 for 1× symbols).

FIG. 13 illustrates an example 80 MHz HE-STF tone plan 1300 having 0.8 μs periodicity, according to one embodiment. The tone plan 1300 can be used with, for example, the HE-STF 458 of FIG. 7, or any other training field discussed herein. In an embodiment, the tone plan 1300 corresponds to OFDM tones, in the frequency domain, generated using a 1024-point FFT. The tone plan 1300 can be transmitted over a bandwidth of 80 MHz with a periodicity of 0.8 μs. The tone plan 1300 includes 1024 OFDM tones indexed −512 to 511. The tone plan 1300 can include the 14 populated STF tones 905 of FIG. 9, copied four times on either side of DC, plus 6 additional populated tones 1310 at sub-band DC and sub-band edges. The outer-most tone indexes may be determined by the data tone plan for 80 MHz transmissions. Thus, the tone plan 1300 can include 62 total populated STF tones 1305 and 1310 at indices −496, −480, −464, −448, −432, −416, −400, −384, −368, −352, −336, −320, −304, −288, −272, −256, −240, −224, −208, −192, −176, −160, −144, −128, −112, −96, −80, −64, −48, −32, −16, 16, 32, 48, 64, 80, 96, 112, 128, 144, 160, 176, 192, 208, 224, 240, 256, 272, 288, 304, 320, 336, 352, 368, 384, 400, 416, 432, 448, 464, 480, and 496. The populated STF tones 1305 and 1310 can be used, for example, for AGC. In general, the tone plan 1100 can include populated STF tones 1105 and/or 1110 starting at tone indices ±16 for 4× symbols (±4 for 1× symbols) each STF tone being spaced by 16 for 4× symbols (4 for 1× symbols).

FIG. 14 illustrates an example 80 MHz HE-STF tone plan 1400 having 0.8 μs periodicity, according to another embodiment. The tone plan 1400 can be used with, for example, the HE-STF 458 of FIG. 7, or any other training field discussed herein. In an embodiment, the tone plan 1400 corresponds to OFDM tones, in the frequency domain, generated using a 1024-point FFT. The tone plan 1400 can be transmitted over a bandwidth of 80 MHz with a periodicity of 0.8 μs. The tone plan 1400 includes 1024 OFDM tones indexed −512 to 511. The tone plan 1400 can include the 14 populated STF tones 905 of FIG. 9, copied four times on either side of DC, and shifted by 8 tones, plus 6 additional populated tones 1410 at sub-band DC and sub-band edges. The outer-most tone indexes may be determined by the data tone plan for 80 MHz transmissions. Thus, the tone plan 1400 can include 62 total populated STF tones 1405 and 1410 at indices −488, −472, −456, −440, −424, −408, −392, −376, −360, −344, −328, −312, −296, −280, −264, −248, −232, −216, −200, −184, −168, −152, −136, −120, −104, −88, −72, −56, −40, −24, −8, 8, 24, 40, 56, 72, 88, 104, 120, 136, 152, 168, 184, 200, 216, 232, 248, 264, 280, 296, 312, 328, 344, 360, 376, 392, 408, 424, 440, 456, 472, 488. The populated STF tones 1405 and 1410 can be used, for example, for AGC. In various embodiments, the STF tones 1405 and 1410 shown in the tone plan 1400 of FIG. 14 can be shifted by another number of tones such as, for example, by 6 or 10 tones. In general, the tone plan 1400 can include populated STF tones 1405 and/or 1410 starting at tone indices ±8 for 4× symbols (±2 for 1× symbols) each STF tone being spaced by 16 for 4× symbols (4 for 1× symbols).

FIG. 15 illustrates an example 20 MHz HE-STF tone plan 1500 having 1.6 µs periodicity, according to an embodiment. The tone plan 1500 can be used with, for example, the HE-STF 458 of FIG. 7, or any other training field discussed herein. In an embodiment, the tone plan 1500 corresponds to OFDM tones, in the frequency domain, generated using a 256-point FFT. The tone plan 1500 can be transmitted over a bandwidth of 20 MHz with a periodicity of 1.6 µs. The tone plan 1500 includes 256 OFDM tones indexed −128 to 127. The tone plan 1500 can include a 40 MHz tone plan for the L-STF 422 of FIG. 5 or 6, scaled by 2, plus 6 additional populated tones 1510 at sub-band DC and sub-band edges. Thus, the tone plan 1500 can include 30 total populated STF tones 1505 and 1510 at indices −120, −112, −104, −96, −88, −80, −72, −64, −56, −48, −40, −32, −24, −16, −8, 8, 16, 24, 32, 40, 48, 56, 64, 72, 80, 88, 96, 104, 112, and 120. The populated STF tones 1505 and 1510 can be used, for example, for AGC. In general, the tone plan 1500 can include populated STF tones 1505 and/or 1510 starting at tone indices ±8 for 4× symbols (±2 for 1× symbols) each STF tone being spaced by 8 for 4× symbols (2 for 1× symbols).

FIG. 16 illustrates an example 40 MHz HE-STF tone plan 1600 having 1.6 µs periodicity, according to an embodiment. The tone plan 1600 can be used with, for example, the HE-STF 458 of FIG. 7, or any other training field discussed herein. In an embodiment, the tone plan 1600 corresponds to OFDM tones, in the frequency domain, generated using a 512-point FFT. The tone plan 1600 can be transmitted over a bandwidth of 40 MHz with a periodicity of 1.6 µs. The tone plan 1600 includes 512 OFDM tones indexed −256 to 255. The tone plan 1600 can include the 20 MHz tone plan 1500 of FIG. 15, copied on either side of DC, plus 2 additional populated tones 1610 at sub-band DC. The outer-most tone indexes may be determined by the data tone plan for 40 MHz transmissions. Thus, the tone plan 1600 can include 60 total populated STF tones 1605 and 1610 at indices −240, −232, −224, −216, −208, −200, −192, −184, −176, −168, −160, −152, −144, −136, −128, −120, −112, −104, −96, −88, −80, −72, −64, −56, −48, −40, −32, −24, −16, −8, 8, 16, 24, 32, 40, 48, 56, 64, 72, 80, 88, 96, 104, 112, 120, 128, 136, 144, 152, 160, 168, 176, 184, 192, 200, 208, 216, 224, 232, and 240. The populated STF tones 1605 and 1610 can be used, for example, for AGC. In general, the tone plan 1600 can include populated STF tones 1605 and/or 1610 starting at tone indices ±8 for 4× symbols (±2 for 1× symbols) each STF tone being spaced by 8 for 4× symbols (2 for 1× symbols).

FIG. 17 illustrates an example 80 MHz HE-STF tone plan 1700 having 1.6 µs periodicity, according to an embodiment. The tone plan 1700 can be used with, for example, the HE-STF 458 of FIG. 7, or any other training field discussed herein. In an embodiment, the tone plan 1700 corresponds to OFDM tones, in the frequency domain, generated using a 1024-point FFT. The tone plan 1700 can be transmitted over a bandwidth of 80 MHz with a periodicity of 1.6 µs. The tone plan 1700 includes 1024 OFDM tones indexed −512 to 511. The tone plan 1700 can include the 20 MHz tone plan 1500 of FIG. 15, copied four times, plus 6 additional populated tones 1710 at sub-band DC and edges. The outer-most tone indexes may be determined by the data tone plan for 80 MHz transmissions. Thus, the tone plan 1700 can include 124 total populated STF tones 1705 and 1710 at indices −496, −488, −480, −472, −464, −456, −448, −440, −432, −424, −416, −408, −400, −392, −384, −376, −368, −360, −352, −344, −336, −328, −320, −312, −304, −296, −288, −280, −272, −264, −256, −248, −240, −232, −224, −216, −208, −200, −192, −184, −176, −168, −160, −152, −144, −136, −128, −120, −112, −104, −96, −88, −80, −72, −64, −56, −48, −40, −32, −24, −16, −8, 8, 16, 24, 32, 40, 48, 56, 64, 72, 80, 88, 96, 104, 112, 120, 128, 136, 144, 152, 160, 168, 176, 184, 192, 200, 208, 216, 224, 232, 240, 248, 256, 264, 272, 280, 288, 296, 304, 312, 320, 328, 336, 344, 352, 360, 368, 376, 384, 392, 400, 408, 416, 424, 432, 440, 448, 456, 464, 472, 480, 488, and 496. The populated STF tones 1705 and 1710 can be used, for example, for AGC. In general, the tone plan 1700 can include populated STF tones 1705 and/or 1710 starting at tone indices ±8 for 4× symbols (±2 for 1× symbols) each STF tone being spaced by 8 for 4× symbols (2 for 1× symbols).

As discussed above with respect to FIGS. 8-17, various 20 MHz HE-STF tone plans can be constructed by generating L-STF tone plan, with additional populated STF tones at sub-band edges, and/or shifting the tones. 40 MHz and 80 MHz HE-STF tone plans can be constructed by copying the 20 MHz HE-STF tone plan, and adding additional populated STF tones at sub-band DC tones and/or edges. In some embodiments, the HE-STF tone plans can be populated with STF tones sufficient to minimize a time-domain PAPR for the HE-STF.

Referring back to FIG. 7, in various embodiments, the HE-STF 458 can be repeated for a plurality of periods. In one embodiment, the HE-STF 458 can be repeated 5 times with a 0.8 µs periodicity and 16-tone sampling. In another embodiment, the HE-STF 458 can be repeated 6 times with a 0.8 µs periodicity. In another embodiment, the HE-STF 458 can be repeated 5 times with a 1.6 µs periodicity and 8-tone sampling. In another embodiment, the HE-STF 458 can be repeated 2 times with a 1.6 µs periodicity and 3 times with a 0.8 µs periodicity. In another embodiment, the HE-STF 458 can be repeated 5 times with a 0.8 µs periodicity for DL and UL SU communications, and the HE-STF 458 can be repeated 5 times with a 1.6 µs periodicity for UL MU and UL OFDMA communications.

Figure 18:
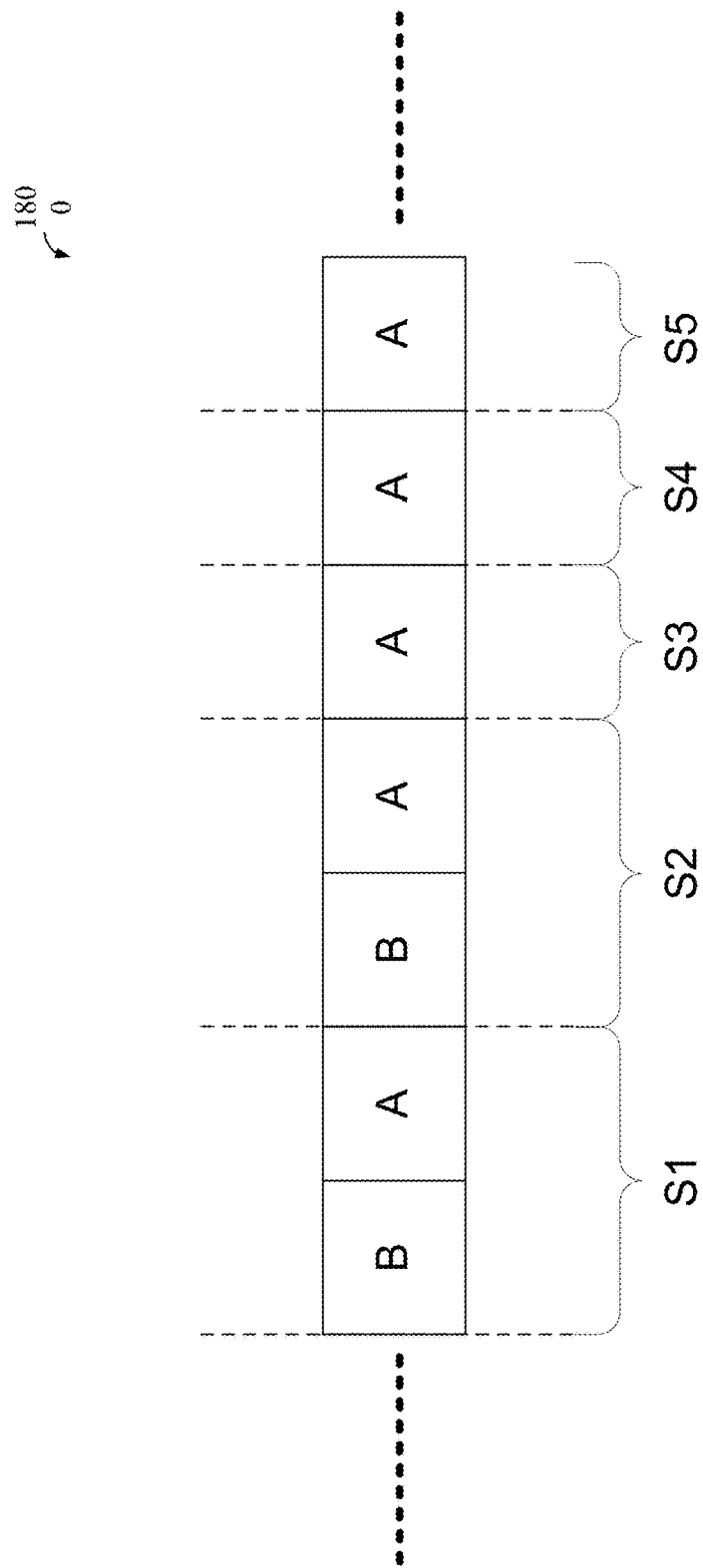
FIG. 18 illustrates an example HE-STF having 0.8 µs and 1.6 µs segments, according to an embodiment.

FIG. 18 illustrates an example HE-STF 1800 having 0.8 µs and 1.6 µs segments, according to an embodiment. The HE-STF 1800 can be a portion of, for example, the HE-STF 458 of FIG. 7, or any other training field discussed herein. As discussed above, the HE-STF 1800 can include one or more 0.8 µs portions and/or one or more 1.6 µs portions. In some embodiments, the 1.6 µs portions can include two 0.8 µs portions each. For example, the illustrated HE-STF 1800 includes two 1.6 µs segments S1 and S2 and three 0.8 µs segments S3, S4, and S5. In embodiments where power measurement uses 1.6 us segments, the HE-STF 1800 can include three 0.8 µs segments having a waveform per segment (A) identical to the last 0.8 us portion of the waveform for the power measurement (B+A). In various embodiments, the waveform B can be either identical or non-identical to the waveform A. Accordingly, different segments can each have the same inter-symbol interference (ISI) level.

Figure 19:
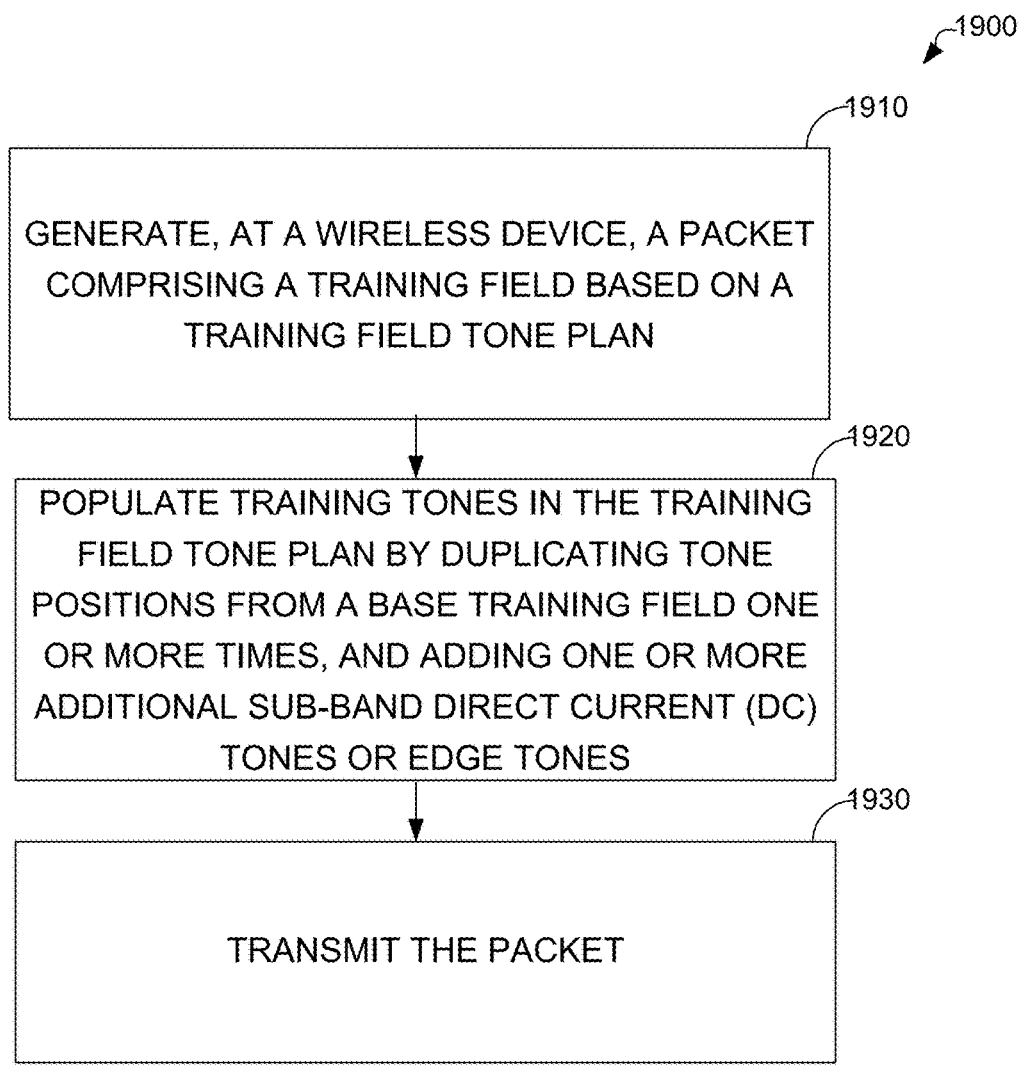
FIG. 19 shows a flowchart for an example method of wireless communication that can be employed within the wireless communication system of FIG. 1.

FIG. 19 shows a flowchart 1900 for an example method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1, the packets 700 and 1800 of FIGS. 7 and 18, and the tone plans 800-1600 discussed above with respect to FIGS. 8-16, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1910, a wireless device generates a packet including a training field based on a training field tone plan. For example the STA 106 or the AP 104 can generate the packet 700 of FIG. 7. The packet 700 can include the training field (e.g., training fields 458 and/or 465), which can include one or more repetitions, for example according to the tone plans and periodicities discussed above with respect to FIGS. 8-18.

Next, at block 1920, the device populates training tones based on duplicating tone positions from a base training field one or more times, and adding one or more additional sub-band direct current (DC) tones or edge tones. In various embodiments, the base training field can be either a legacy training field (e.g., L-STF) or a HE training field (e.g., HE-STF used for an IEEE 802.11ax 20 MHz operation). For example, in implementations where the HE-STF is used as the base training field for duplication, 40 MHz or 80 MHz mode HE-STF tones in the training field tone plan may be generated by duplicating tone positions from the training field tone plans from the 20 MHz operation. As another example, the STA 106 or AP 104 can generate a 20 MHz HE-STF, by shifting and/or adding tones to the tone plan for the L-STF 422, according to tone plans 800-1000 of FIGS. 8-10 by shifting and/or adding tones to the tone plan for the L-STF 422. As another example, the STA 106 or AP 104 can generate 40 MHz and 80 MHz tone plans by shifting and/or adding tones to copies of the 20 MHz HE-STF tone plans 800-1000 of FIGS. 8-10, for example according to the tone plans 1100-1700 of FIGS. 11-17. Thus, in various examples, the base training field can be the L-STF 422 and/or the 20 MHz HE-STF.

In various embodiments, the method can further include shifting the base training field. In various embodiments, the training field can include a first training field portion having one or more repetitions at a first periodicity, and a second training field portion having one or more repetitions at a second periodicity. In various embodiments, the first periodicity and the second periodicity can be 0.8 µs.

In various embodiments, the training field can include populated training tones at: for a 20 MHz transmission, one of tone indices −96, −80, −64, −48, −32, −16, 16, 32, 48, 64, 80, and 96, tone indices −112, −96, −80, −64, −48, −32, −16, 16, 32, 48, 64, 80, 96, and 112, or tone indices −120, −104, −88, −72, −56, −40, −24, −8, 8, 24, 40, 56, 72, 88, 104, and 120; for a 40 MHz transmission, one of tone indices −240, −224, −208, −192, −176, −160, −144, −128, −112, −96, −80, −64, −48, −32, −16, 16, 32, 48, 64, 80, 96, 112, 128, 144, 160, 176, 192, 208, 224, and 240, or tone indices −232, −216, −200, −184, −168, −152, −136, −120, −104, −88, −72, −56, −40, −24, −8, 8, 24, 40, 56, 72, 88, 104, 120, 136, 152, 168, 184, 200, 216, and 232; and for an 80 MHz transmission, one of: tone indices −496, −480, −464, −448, −432, −416, −400, −384, −368, −352, −336, −320, −304, −288, −272, −256, −240, −224, −208, −192, −176, −160, −144, −128, −112, −96, −80, −64, −48, −32, −16, 16, 32, 48, 64, 80, 96, 112, 128, 144, 160, 176, 192, 208, 224, 240, 256, 272, 288, 304, 320, 336, 352, 368, 384, 400, 416, 432, 448, 464, 480, and 496, or tone indices −488, −472, −456, −440, −424, −408, −392, −376, −360, −344, −328, −312, −296, −280, −264, −248, −232, −216, −200, −184, −168, −152, −136, −120, −104, −88, −72, −56, −40, −24, −8, 8, 24, 40, 56, 72, 88, 104, 120, 136, 152, 168, 184, 200, 216, 232, 248, 264, 280, 296, 312, 328, 344, 360, 376, 392, 408, 424, 440, 456, 472, 488.

In various embodiments, the first periodicity and the second periodicity can be 1.6 µs. In various embodiments, the training field can include populated training tones at: for a 20 MHz transmission, tone indices −120, −112, −104, −96, −88, −80, −72, −64, −56, −48, −40, −32, −24, −16, −8, 8, 16, 24, 32, 40, 48, 56, 64, 72, 80, 88, 96, 104, 112, and 120; for a 40 MHz transmission, tone indices −240, −232, −224, −216, −208, −200, −192, −184, −176, −168, −160, −152, −144, −136, −128, −120, −112, −104, −96, −88, −80, −72, −64, −56, −48, −40, −32, −24, −16, −8, 8, 16, 24, 32, 40, 48, 56, 64, 72, 80, 88, 96, 104, 112, 120, 128, 136, 144, 152, 160, 168, 176, 184, 192, 200, 208, 216, 224, 232, and 240; and for an 80 MHz transmission, tone indices −496, −488, −480, −472, −464, −456, −448, −440, −432, −424, −416, −408, −400, −392, −384, −376, −368, −360, −352, −344, −336, −328, −320, −312, −304, −296, −288, −280, −272, −264, −256, −248, −240, −232, −224, −216, −208, −200, −192, −184, −176, −168, −160, −152, −144, −136, −128, −120, −112, −104, −96, −88, −80, −72, −64, −56, −48, −40, −32, −24, −16, −8, 8, 16, 24, 32, 40, 48, 56, 64, 72, 80, 88, 96, 104, 112, 120, 128, 136, 144, 152, 160, 168, 176, 184, 192, 200, 208, 216, 224, 232, 240, 248, 256, 264, 272, 280, 288, 296, 304, 312, 320, 328, 336, 344, 352, 360, 368, 376, 384, 392, 400, 408, 416, 424, 432, 440, 448, 456, 464, 472, 480, 488, and 496.

In various embodiments, the first periodicity and the second periodicity can be 0.8 µs for single-user transmissions and 1.6 µs for multi-user transmissions. In various embodiments, the first periodicity is 1.6 µs and the second periodicity is 0.8 µs. In various embodiments, the training field can include 2 repetitions of the first training field portion at 1.6 µs periodicity and 3 repetitions of the second training field portion at 0.8 µs periodicity. In various embodiments, the first portion includes first and second 0.8 µs segments, and the second portion includes the second 0.8 µs segment.

Then, at block 1930, the device transmits the packet. For example, the STA 106 or AP 104 can transmit the packet 700 of FIG. 7.

In various embodiments, the method can further include scaling the training field on a per-resource unit basis. For example, scaling can be performed as discussed herein with respect to FIGS. 20-21. In various embodiments, said scaling can be proportional to a number of tones in an assigned resource unit. In various embodiments, said scaling can be performed on high-efficiency fields, in addition to scaling performed for one or more legacy fields.

In various embodiments, a magnitude of the training field at a time t, can be scaled by (the square root of a total number of tones that an assigned resource unit includes for payload transmission, divided by the square root of (a number of tones of the training field populated in the assigned resource unit, times a total number of space-time streams transmitted in the assigned resource unit)) times a window function, times (a spatial mapping matrix for a subcarrier k, times a tone rotation on tone k, times a value of the training field at a tone k, times e raised to the power of (a tone spacing, times (t minus a cyclic shift delay for an m-th spatial stream), times j2π), summed over each tone k in the training field, each user u in the assigned resource unit, and each spatial stream m for each user). For example, the above scaling can be applied to the HE-STF 458 of FIG. 7.

In various embodiments, a magnitude of the training field at a time t, can be scaled by (the square root of a total number of tones that an assigned resource unit includes for payload transmission, divided by the square root of (a number of tones of the training field populated in the assigned resource unit, times a total number of space-time streams transmitted in the assigned resource unit)) times (a window function for time values of each training field symbol, times (a spatial mapping matrix for a subcarrier k, times a tone rotation on a tone k, times a P- or R-matrix value at tone k, times a value of the training field at tone k, times e raised to the power of (a tone spacing, times (t minus the time values of each symbol of the training field, minus a guard interval duration, minus a cyclic shift delay for the m-th spatial stream), times j2π), summed over each tone k in the training field, each user u in the resource unit, and each spatial stream m for each user)), summed over each symbol in the training field. For example, the above scaling can be applied to the HE-LTF 465 of FIG. 7.

In an embodiment, the method shown in FIG. 19 can be implemented in a wireless device that can include a generating circuit, a populating circuit, and a transmitting circuit. Those skilled in the art will appreciate that a wireless device can have more components than the simplified wireless device described herein. The wireless device described herein includes only those components useful for describing some features of implementations within the scope of the claims.

The generating circuit can be configured to generate the packet. In some embodiments, the generating circuit can be configured to perform at least block 1910 of FIG. 19. The generating circuit can include one or more of the processor 204 (FIG. 2), the memory 206 (FIG. 2), and the DSP 220 (FIG. 2). In some implementations, means for generating can include the generating circuit.

The populating circuit can be configured to populate training tones. In some embodiments, the populating circuit can be configured to perform at least block 1920 of FIG. 19. The segmenting circuit can include one or more of the processor 204 (FIG. 2), the memory 206 (FIG. 2), and the DSP 220 (FIG. 2). In some implementations, means for populating can include the populating circuit.

The transmitting circuit can be configured to transmit the first and second messages together. In some embodiments, the transmitting circuit can be configured to perform at least block 1930 of FIG. 19. The transmitting circuit can include one or more of the transmitter 210 (FIG. 2), the antenna 216 (FIG. 2), and the transceiver 214 (FIG. 2). In some implementations, means for transmitting can include the transmitting circuit.

In various embodiments, the wireless device can further include a scaling circuit. The scaling circuit can be configured to scale the training field (for example, an HE-STF). The scaling circuit can include one or more of the processor 204 (FIG. 2), the memory 206 (FIG. 2), the transmitter 210 (FIG. 2), the transceiver 214 (FIG. 2), and the DSP 220 (FIG. 2). In some implementations, means for scaling can include the scaling circuit.

HE-STF and HE-LTF Scaling

In various embodiments, scaling can be applied, on a per-RU basis, to any HE fields discussed herein (for example, the HE-SIG0 455, the HE-SIG1A 457, the HE-STF 458, the HE-LTF 465, DATA1-DATA4, and so on, of FIG. 7) proportional to number of tones in each assigned RU. In various embodiments, such scaling of HE fields can be referred to as HE scaling or 11ax scaling. HE scaling can be performed in an addition to scaling of legacy field, for example as defined in IEEE 802.11ac, to provide per-tone power that is the same (or substantially the same) for DL data in different RU sizes. For example, for HE-STF, HE-LTF, and/or HE data fields, a wireless device can normalize the total field power in each RU based on the number of the populated field tones and the number of streams in that RU. The wireless device should further scale the total field power by multiplying the square root of the total number of tones in RU. Mathematically, this scaling corresponds to the equation shown in FIGS. 20-21.

FIG. 20 is a time-domain representation of an HE-STF waveform, according to one embodiment. In various embodiments, the illustrated equation can provide, for example, improved power measurement for automatic gain control (AGC) functions. As shown in FIG. 20, $N_{HE\text{-}STF,i_{RU}}^{Tone}$ $N_{HE\text{-}STF,i_{RU}}^{Tone}$ represents the number of STF tones populated in an assigned RU ($i_{RU}$), which can be different between various RUs, even where those RUs have the same size. $N_{HE\text{-}data,i_{RU}}^{Tone}$ $N_{HE\text{-}data,i_{RU}}^{Tone}$ represents the total number of tones that the assigned RU includes for payload transmission, which can also be described as the number of data tones plus pilot tones in the assigned RU. $N_{STS,total,i_{RU}}$ $N_{STS,total,i_{RU}}$ represents a total number of space-time streams transmitted in the assigned resource unit. $W_{T_{HE\text{-}STF}}(t)$ $W_{T_{HE\text{-}STF}}(t)$ represents a window function, for example as defined in the IEEE 802.11a specification. $Q_k$ represents a spatial mapping matrix for a subcarrier k. $Y_k$ represents a tone rotation on tone k. $T_{CSD,m}$ represents the cyclic shift delay (CSD) the m-th spatial stream (ss). $HES_k$ represents the HE-STF value at tone k. Finally, $\Delta_F$ represents the tone spacing.

Accordingly, in the illustrated embodiment, the magnitude of the HE-STF for the assigned RU at time t is given by: (the square root of the total number of tones that the assigned RU includes for payload transmission, divided by the square root of (the number of STF tones populated in the assigned RU, times a total number of space-time streams transmitted in the assigned resource unit)) times the window function, times (the spatial mapping matrix for the subcarrier k, times the tone rotation on tone k, times the HE-STF value at tone k, times e raised to the power of (the tone spacing, times (t minus the CSD for the m-th spatial stream), times j2π), summed over each STF tone k in the RU, each user u in the RU, and each spatial stream m for each user).

FIG. 21 is a time-domain representation of an HE-LTF waveform, according to one embodiment. In various embodiments, the illustrated equation can provide, for example, improved power measurement for automatic gain control (AGC) functions and improved channel estimation accuracy. As shown in FIG. 21, $N_{HE\text{-}STF,i_{RU}}^{Tone}$ represents the number of LTF tones populated in an assigned RU ($i_{RU}$), which can be different between various RUs, even where those RUs have the same size. $N_{HE\text{-}data,i_{RU}}^{Tone}$ represents the total number of tones that the assigned RU includes for payload transmission, which can also be described as the number of data tones plus pilot tones in the assigned RU. $N_{STS,total,i_{RU}}$ represents a total number of space-time streams transmitted in the assigned resource unit. $W_{T_{HE\text{-}LTF}}(t)$ $W_{T_{HE\text{-}LTF}}(t)$ represents a window function, for example as defined in the IEEE 802.11a specification. $N_{HELTF}$ represents the number of HE-LTF symbols in the transmission. $T_{HELTF}$ represents the HE-LTF symbol duration, which can vary with different compression modes (e.g., 2× or 4× compression modes) and can vary with different guard interval (GI) duration assigned for the HE-LTF. $Q_k$ represents a spatial mapping matrix for a subcarrier k. $Y_k$ represents a tone rotation on tone k. $A_k$ represents a P-value for non-pilot LTF tone k, or an R-value for pilot tone k. $T_{CSD,m}$ represents the cyclic shift delay (CSD) the m-th spatial stream (ss). $HELTF_k$ represents the HE-LTF value at tone k. Finally, $\Delta_F$ represents the tone spacing.

In various embodiments, a P matrix is applied on HE-LTF symbols for channel estimation purposes. The P matrix, one example of which is defined in the IEEE 802.11ac specification. The R matrix, one example of which is also defined in the IEEE 802.11ac specification, is applicable only on single stream pilots in HE-LTF symbols to enable phase tracking during LTF channel estimation. Each row of R matrix is the same as the first row of the P matrix. Generally, pilot tones can be multiplied by an R matrix while all other tones are multiplied by the P matrix, each of which are defined in the IEEE 802.11ac specification.

Accordingly, in the illustrated embodiment, the magnitude of the HE-LTF for the assigned RU at time t is given by: (the square root of the total number of tones that the assigned RU includes for payload transmission, divided by the square root of (the number of LTF tones populated in the assigned RU, times a total number of space-time streams transmitted in the assigned resource unit)) times (the window function for time values of each LTF symbol, times (the spatial mapping matrix for the subcarrier k, times the tone rotation on tone k, times a P- or R-matrix value at tone k, times the HE-LTF value at tone k, times e raised to the power of (the tone spacing, times (t minus the time values of each LTF symbol, minus the guard interval duration, minus the cyclic shift delay for the m-th spatial stream), times j2π), summed over each STF tone k in the RU, each user u in the RU, and each spatial stream m for each user)), summed over each LTF symbol.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can include non-transitory computer readable medium (e.g., tangible media). In addition, in some aspects computer readable medium can include transitory computer readable medium (e.g., a signal). Combinations of the above can also be included within the scope of computer-readable media.

The methods disclosed herein include one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it can be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method of wireless communication, comprising:
generating, at a wireless device, a packet comprising a training field based on a training field tone plan by:
populating training tone positions in the training field tone plan by duplicating tone positions from a base training field one or more times, and adding one or more additional training tone positions at sub-band direct current (DC) tones or edge tones; and
scaling the training field, for each resource unit of a plurality of resource units, proportional to a square root of a total number of tones that the resource unit includes for payload transmission; and
transmitting the packet.

2. The method of claim 1, wherein a magnitude of the training field at a time t, is scaled by (the square root of a total number of tones that an assigned resource unit includes for payload transmission, divided by the square root of (a number of tones of the training field populated in the assigned resource unit, times a total number of space-time streams transmitted in the assigned resource unit)) times a window function, times (a spatial mapping matrix for a subcarrier k, times a tone rotation on tone k, times a value of the training field at a tone k, times e raised to the power of (a tone spacing, times (t minus a cyclic shift delay for an m-th spatial stream), times j2π), summed over each tone k in the training field, each user u in the assigned resource unit, and each spatial stream m for each user).

3. The method of claim 1, wherein a magnitude of the training field at a time t, is scaled by (the square root of a total number of tones that an assigned resource unit includes for payload transmission, divided by the square root of (a number of tones of the training field populated in the assigned resource unit, times a total number of space-time streams transmitted in the assigned resource unit)) times (a window function for time values of each training field symbol, times (a spatial mapping matrix for a subcarrier k, times a tone rotation on a tone k, times a P- or R-matrix value at tone k, times a value of the training field at tone k, times e raised to the power of (a tone spacing, times (t minus the time values of each symbol of the training field, minus a guard interval duration, minus a cyclic shift delay for the m-th spatial stream), times j2π), summed over each tone k in the training field, each user u in the resource unit, and each spatial stream m for each user)), summed over each symbol in the training field.

4. The method of claim 1, further comprising shifting the base training field.

5. The method of claim 1, wherein the training field comprises a first training field portion having one or more repetitions at a first periodicity, and a second training field portion having one or more repetitions at a second periodicity.

6. The method of claim 5, wherein the first periodicity and the second periodicity are 0.8 µs.

7. The method of claim 6, wherein the training field comprises populated training tones at:
for a 20 MHz transmission, one of:
tone indices −96, −80, −64, −48, −32, −16, 16, 32, 48, 64, 80, and 96,
tone indices −112, −96, −80, −64, −48, −32, −16, 16, 32, 48, 64, 80, 96, and 112, or
tone indices −120, −104, −88, −72, −56, −40, −24, −8, 8, 24, 40, 56, 72, 88, 104, and 120;
for a 40 MHz transmission, one of:
tone indices −240, −224, −208, −192, −176, −160, −144, −128, −112, −96, −80, −64, −48, −32, −16, 16, 32, 48, 64, 80, 96, 112, 128, 144, 160, 176, 192, 208, 224, and 240, or
tone indices −232, −216, −200, −184, −168, −152, −136, −120, −104, −88, −72, −56, −40, −24, −8, 8, 24, 40, 56, 72, 88, 104, 120, 136, 152, 168, 184, 200, 216, and 232; and
for an 80 MHz transmission, one of:
tone indices −496, −480, −464, −448, −432, −416, −400, −384, −368, −352, −336, −320, −304, −288, −272, −256, −240, −224, −208, −192, −176, −160, −144, −128, −112, −96, −80, −64, −48 , −32, −16, 16, 32, 48, 64, 80, 96, 112, 128, 144, 160, 176, 192, 208, 224, 240, 256, 272, 288, 304, 320, 336, 352, 368, 384, 400, 416, 432, 448, 464, 480, and 496, or
tone indices −488, −472, −456, −440, −424, −408, −392, −376, −360, −344, −328, −312, −296, −280, −264, −248, −232, −216, −200, −184, −168, −152, −136, −120, −104, −88, −72, −56, −40, −24, −8, 8, 24, 40, 56, 72, 88, 104, 120, 136, 152, 168, 184, 200, 216, 232, 248, 264, 280, 296, 312, 328, 344, 360, 376, 392, 408, 424, 440, 456, 472, 488.

8. The method of claim 5, wherein the first periodicity and the second periodicity are 1.6 µs.

9. The method of claim 8, wherein the training field comprises populated training tones at:
for a 20 MHz transmission, tone indices −120, −112, −104, −96, −88, −80, −72, −64, −56, −48, −40, −32, −24, −16, −8, 8, 16, 24, 32, 40, 48, 56, 64, 72, 80, 88, 96, 104, 112, and 120;
for a 40 MHz transmission, tone indices −240, −232, −224, −216, −208, −200, −192, −184, −176, −168, −160, −152, −144, −136, −128, −120, −112, −104, −96, −88, −80, −72, −64, −56, −48, −40, −32, −24, −16, −8, 8, 16, 24, 32, 40, 48, 56, 64, 72, 80, 88, 96, 104, 112, 120, 128, 136, 144, 152, 160, 168, 176, 184, 192, 200, 208, 216, 224, 232, and 240; and
for an 80 MHz transmission, tone indices −496, −488, −480, −472, −464, −456, −448, −440, −432, −424, −416, −408, −400, −392, −384, −376, −368, −360, −352, −344, −336, −328, −320, −312, −304, −296, −288, −280, −272, −264, −256, −248, −240, −232, −224, −216, −208, −200, −192, −184, −176, −168, −160, −152, −144, −136, −128, −120, −112, −104, −96, −88, −80, −72, −64, −56, −48, −40, −32, −24, −16, −8, 8, 16, 24, 32, 40, 48, 56, 64, 72, 80, 88, 96, 104, 112, 120, 128, 136, 144, 152, 160, 168, 176, 184, 192, 200, 208, 216, 224, 232, 240, 248, 256, 264, 272, 280, 288, 296, 304, 312, 320, 328, 336, 344, 352, 360, 368, 376, 384, 392, 400, 408, 416, 424, 432, 440, 448, 456, 464, 472, 480, 488, and 496.

10. The method of claim 5, wherein the first periodicity and the second periodicity are 0.8 µs for single-user or downlink transmissions and 1.6 µs for uplink multi-user transmissions.

11. The method of claim 5, wherein the first periodicity is 1.6 µs and the second periodicity is 0.8 µs.

12. The method of claim 11, wherein the training field comprises 2 repetitions of the first training field portion at 1.6 µs periodicity and 3 repetitions of the second training field portion at 0.8 µs periodicity.

13. The method of claim 11, wherein the first portion includes first and second 0.8 µs segments, and the second portion includes the second 0.8 µs segment.

14. The method of claim 1, wherein the base training field comprises at least one of a legacy 20 MHz short training field and a high-efficiency 20 MHz short training field.

15. An apparatus configured to perform wireless communication, comprising:
   a memory that stores instructions;
   a processing system coupled with the memory and configured to execute the instructions to:
      generate a packet comprising a training field based on a training field tone plan by:
         populating training tone positions in the training field tone plan by duplicating tone positions from a base training field one or more times, and adding one or more additional training tone positions at sub-band direct current (DC) tones or edge tones; and
         scaling the training field, for each resource unit of a plurality of resource units, proportional to a square root of a total number of tones that the resource unit includes for payload transmission; and
   a transmitter configured to transmit the packet.

16. The apparatus of claim 15, wherein a magnitude of the training field at a time t, is scaled by (the square root of a total number of tones that an assigned resource unit includes for payload transmission, divided by the square root of (a number of tones of the training field populated in the assigned resource unit, times a total number of space-time streams transmitted in the assigned resource unit)) times a window function, times (a spatial mapping matrix for a subcarrier k, times a value of the training field at a tone k, times e raised to the power of (a tone spacing, times (t minus a cyclic shift delay for an m-th spatial stream), times j2π), summed over each tone k in the training field, each user u in the assigned resource unit, and each spatial stream m for each user).

17. The apparatus of claim 15, wherein a magnitude of the training field at a time t, is scaled by (the square root of a total number of tones that an assigned resource unit includes for payload transmission, divided by the square root of (a number of tones of the training field populated in the assigned resource unit, times a total number of space-time streams transmitted in the assigned resource unit)) times (a window function for time values of each training field symbol, times (a spatial mapping matrix for a subcarrier k, times a tone rotation on a tone k, times a P- or R-matrix value at tone k, times a value of the training field at tone k, times e raised to the power of (a tone spacing, times (t minus the time values of each symbol of the training field, minus a guard interval duration, minus a cyclic shift delay for the m-th spatial stream), times j2π), summed over each tone k in the training field, each user u in the resource unit, and each spatial stream m for each user)), summed over each symbol in the training field.

18. The apparatus of claim 15, wherein the processing system is further configured to shift the base training field.

19. The apparatus of claim 15, wherein the training field comprises a first training field portion having one or more repetitions at a first periodicity, and a second training field portion having one or more repetitions at a second periodicity.

20. The apparatus of claim 19, wherein the first periodicity and the second periodicity are 0.8 µs.

21. The apparatus of claim 20, wherein the training field comprises populated training tones at:
   for a 20 MHz transmission, one of:
      tone indices −96, −80, −64, −48, −32, −16, 16, 32, 48, 64, 80, and 96,
      tone indices −112, −96, −80, −64, −48, −32, −16, 16, 32, 48, 64, 80, 96, and 112, or
      tone indices −120, −104, −88, −72, −56, −40, −24, −8, 8, 24, 40, 56, 72, 88, 104, and 120;
   for a 40 MHz transmission, one of:
      tone indices −240, −224, −208, −192, −176, −160, −144, −128, −112, −96, −80, −64, −48, −32, −16, 16, 32, 48, 64, 80, 96, 112, 128, 144, 160, 176, 192, 208, 224, and 240, or
      tone indices −232, −216, −200, −184, −168, −152, −136, −120, −104, −88, −72, −56, −40, −24, −8, 8, 24, 40, 56, 72, 88, 104, 120, 136, 152, 168, 184, 200, 216, and 232; and
   for an 80 MHz transmission, one of:
      tone indices −496, −480, −464, −448, −432, −416, −400 ,−384, −368, −352, −336, −320, −304, −288, −272, −256, −240, −224, −208, −192, −176, −160, −144, −128, −112, −96, −80, −64, −48 , −32, −16, 16, 32, 48, 64, 80, 96, 112, 128, 144, 160, 176, 192, 208, 224, 240, 256, 272, 288, 304, 320, 336, 352, 368, 384, 400, 416, 432, 448, 464, 480, and 496, or
      tone indices −488, −472, −456, −440, −424, −408, −392, −376, −360, −344, −328, −312, −296, −280, −264, −248, −232, −216, −200, −184, −168, −152, −136, −120, −104, −88, −72, −56, −40, −24, −8, 8, 24, 40, 56, 72, 88, 104, 120, 136, 152, 168, 184, 200, 216, 232, 248, 264, 280, 296, 312, 328, 344, 360, 376, 392, 408, 424, 440, 456, 472, 488.

22. The apparatus of claim 19, wherein the first periodicity and the second periodicity are 1.6 µs.

23. An apparatus for wireless communication, comprising:
   means for generating a packet comprising a training field based on a training field tone plan by:
      populating training tone positions in the training field tone plan by duplicating tone positions from a base training field one or more times, and adding one or more additional training tone positions sub-band direct current (DC) tones or edge tones; and
      scaling the training field, for each resource unit of a plurality of resource units, proportional to a square root of a total number of tones that the resource unit includes for payload transmission; and
   means for transmitting the packet.

24. A non-transitory computer-readable medium comprising code that, when executed, causes an apparatus to:
   generate a packet comprising a training field based on a training field tone plan by:
      populating training tone positions in the training field tone plan by duplicating tone positions from a base training field one or more times, and adding one or more additional training tone positions at sub-band direct current (DC) tones or edge tones; and scaling the training field, for each resource unit of a plurality of resource units, proportional to a square root of a total number of tones that the resource unit includes for payload transmission; and transmit the packet.

* * * * *